United States Patent
Leonard et al.

(10) Patent No.: US 9,945,168 B2
(45) Date of Patent: Apr. 17, 2018

(54) CLOSURE PANEL COUNTERBALANCE MECHANISM WITH FRICTION DEVICE

(71) Applicant: Magna Closures Inc., Newmarket (CA)

(72) Inventors: Jube Leonard, Barrie (CA); Joseph Scheuring, Richmond Hill (CA); Borys M. Shchokin, Thornhill (CA)

(73) Assignee: MAGNA CLOSURES INC., New Market (CA)

( * ) Notice: Subject to any disclaimer, the term of this patent is extended or adjusted under 35 U.S.C. 154(b) by 126 days.

(21) Appl. No.: 14/940,718

(22) Filed: Nov. 13, 2015

(65) Prior Publication Data

US 2016/0069117 A1    Mar. 10, 2016

Related U.S. Application Data

(63) Continuation of application No. PCT/CA2014/000425, filed on May 13, 2014.
(Continued)

(51) Int. Cl.
*E05F 3/22* (2006.01)
*E05F 15/622* (2015.01)
(Continued)

(52) U.S. Cl.
CPC .............. *E05F 3/224* (2013.01); *B60J 5/10* (2013.01); *E05D 13/003* (2013.01); *E05D 13/10* (2013.01);
(Continued)

(58) Field of Classification Search
CPC ........ E05F 3/224; E05D 13/003; E05D 13/10; E05D 13/12
See application file for complete search history.

(56) References Cited

U.S. PATENT DOCUMENTS 4,854,554 A * 8/1989 Ludwig .............. E05F 1/1292
                                              16/66
5,002,172 A    3/1991 Stringer
(Continued)

OTHER PUBLICATIONS

International Search Report & Written Opinion dated Jul. 22, 2014 relating to corresponding PCT International Application No. PCT/CA2014/000425 issued from the Canadian Intellectual Property Office.

*Primary Examiner* — Jeffrey O'Brien

(57) ABSTRACT

A friction based counterbalance mechanism for coupling with a closure panel to assist in opening and closing of the closure panel for at least a portion of a path between a fully closed position and a fully open position of the closure panel, the counterbalance mechanism including: an elongate member positioned on a longitudinal axis extending between the proximal and distal ends of the counterbalance mechanism, the elongate member having a peripheral surface, the elongate member having a proximal end for coupling to one of the closure panel and a body of a vehicle; a travel member having a body and at least one friction member mounted on the body, the travel member positioned on the longitudinal axis for reciprocation there along and for providing contact between the at least one friction member and the peripheral surface, said contact for generating a friction force in a first region along the longitudinal axis and in a second region along the longitudinal axis; and a support member coupled to the travel element at a proximal end and for coupling at a distal end to the other of the closure panel and a body of a vehicle, the support member for guiding said reciprocation. The friction based counterbalance mechanism can be incorporated as part of a biasing strut such as a spring configured strut.

13 Claims, 24 Drawing Sheets

Related U.S. Application Data

(60) Provisional application No. 61/822,799, filed on May 13, 2013.

(51) Int. Cl.
*B60J 5/10* (2006.01)
*E05D 13/00* (2006.01)
*F16H 25/20* (2006.01)

(52) U.S. Cl.
CPC .......... *E05F 15/622* (2015.01); *F16H 25/20* (2013.01); *B60J 5/101* (2013.01); *E05Y 2201/21* (2013.01); *E05Y 2201/26* (2013.01); *E05Y 2201/264* (2013.01); *E05Y 2900/546* (2013.01)

(56) References Cited

U.S. PATENT DOCUMENTS

| | | |
|---|---|---|
| 5,267,416 A | 12/1993 | Davis |
| 5,673,593 A | 10/1997 | Lafferty |
| 6,516,567 B1 | 2/2003 | Stone et al. |
| 7,938,473 B2 | 5/2011 | Paton et al. |
| 8,006,817 B2 | 8/2011 | Hanna et al. |
| 2010/0024161 A1* | 2/2010 | Wood ............... E05C 17/30 16/82 |
| 2016/0177612 A1* | 6/2016 | Buchheim ............ E05F 5/025 296/50 |

\* cited by examiner

FIG. 12a  FIG. 12b  FIG. 12c

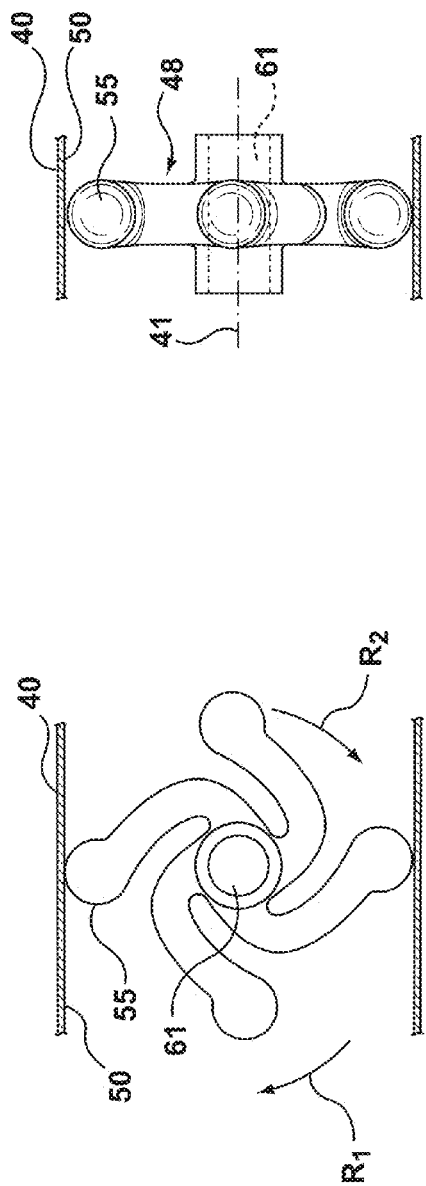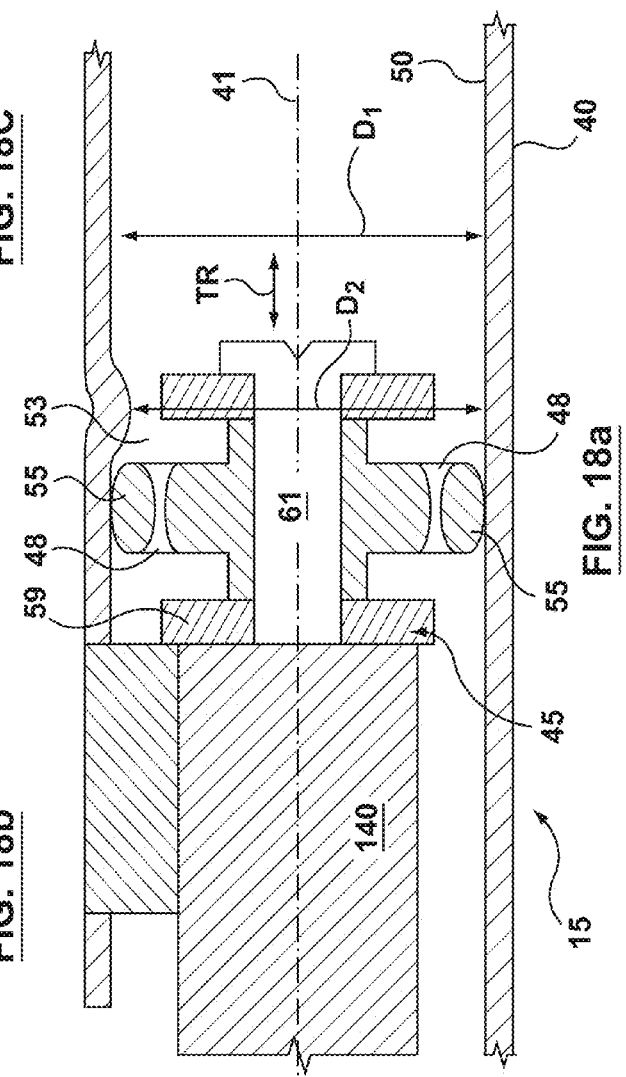

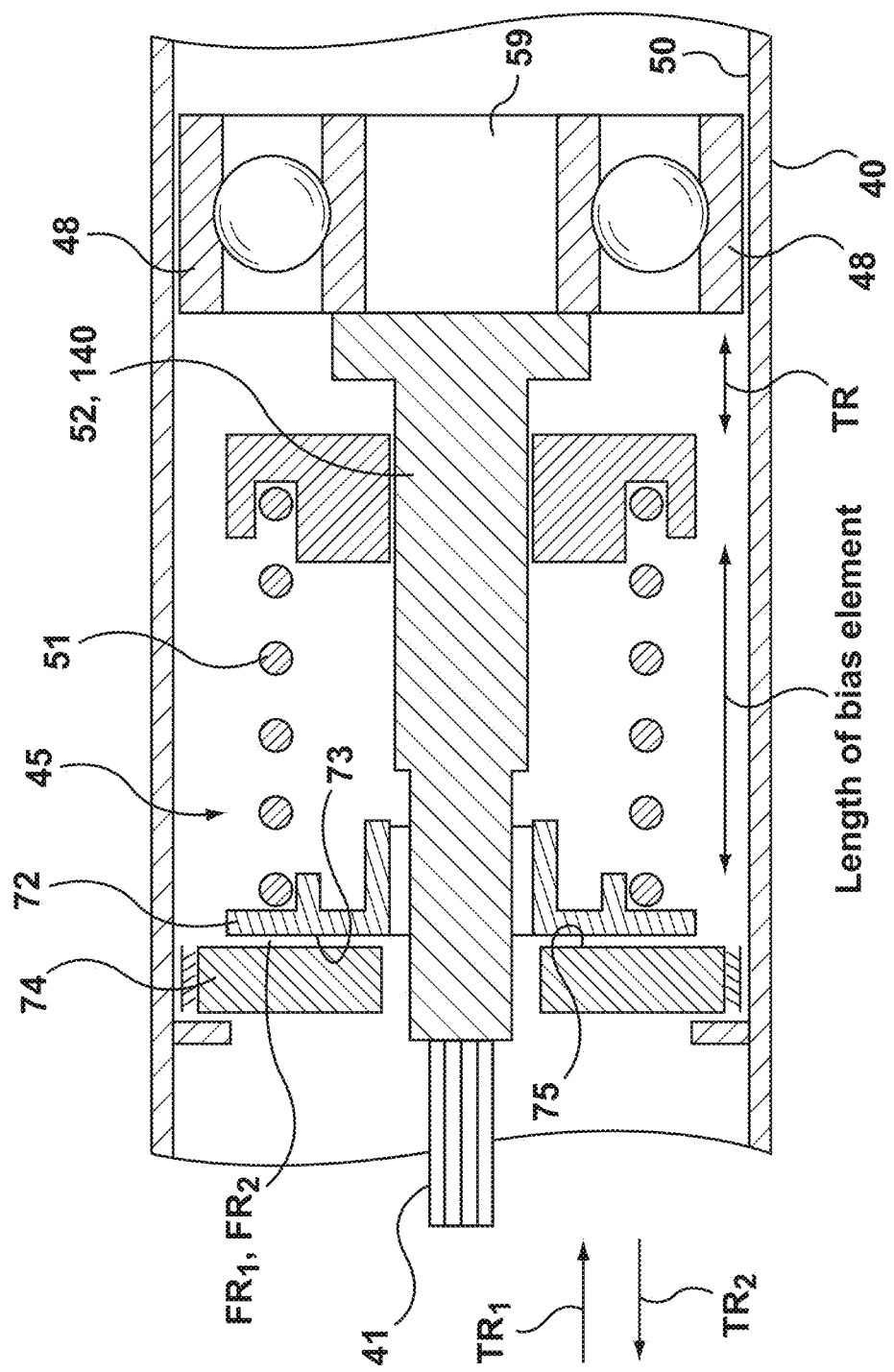

ial Application No. PCT/CA2014/000425 filed May 13, 2014 which claims the benefit of U.S. Provisional Application No. 61/822,799, filed May 13, 2013, the contents of which are incorporated herein in their entirety.

CLOSURE PANEL COUNTERBALANCE MECHANISM WITH FRICTION DEVICE

CROSS-REFERENCE TO RELATED APPLICATIONS

This application is a continuation application of PCT International Application No. PCT/CA2014/000425 filed May 13, 2014 which claims the benefit of U.S. Provisional Application No. 61/822,799, filed May 13, 2013, the contents of which are incorporated herein in their entirety.

FIELD

This disclosure relates to a friction based counterbalance system for a closure panel.

BACKGROUND

Some vehicles are equipped with a closure panel, such as a lift gate, which is driven between an open position (position 2) and a closed position (position 1) using an electric drive system. Hold systems have been proposed to provide such vehicles with the capability of assisting the operator of the closure panel, in order to maintain a third position hold (or position 2) during opening and closing operations, so as to help counteract the weight of the closure panel itself. Without these hold systems, the closure panel may sag back down at the top end of the operational opening range due to the closure panel weight providing a closure torque greater than an opening torque provided by the electric drive system. Such proposed hold systems are, in some instances, complex and expensive and may not offer adequate failsafe modes (in the event of electric motor failure or loss of power) while at the same time maintaining adequate manual efforts by the operator. Also recognized is a need to provide a counterbalance mechanism that can offer efficient counterbalance force customization for different closure panel weights and configurations (e.g. differing centers of gravity), including the ability to accommodate for third position hold or stop and hold functionality of the closure panel.

Further disadvantages of current hold systems include bulky form factors which take up valuable vehicle cargo space, requirement to have additional lift support systems in tandem such as gas struts and other counterbalance mechanisms, unacceptable impact on manual open and close efforts requiring larger operator applied manual force at the panel handle, undesirable force spikes that do not provide for smoother manual force/torque curves, requirement to use vehicle battery power to maintain third position hold, and/or temperature effects resulting in variable manual efforts required by the operator due to fluctuations in ambient temperature.

It is recognized that constantly applied forces in a counterbalance mechanism can be problematic due to variations in the geometry and/or operator positioning during the complete raise and lowering cycle of a closure panel, including the ability to provide for third position hold where desired.

SUMMARY

It is an object of the present invention to provide a counterbalance mechanism that obviates or mitigates at least one of the above presented disadvantages.

Further disadvantages of current hold systems include bulky form factors which take up valuable vehicle cargo space, requirement to have additional lift support systems in tandem such as gas struts and other counterbalance mechanisms, unacceptable impact on manual open and close efforts requiring larger operator applied manual force at the panel handle, undesirable force spikes that do not provide for smoother manual force/torque curves, requirement to use vehicle battery power to maintain third position hold, and/or temperature effects resulting in variable manual efforts required by the operator due to fluctuations in ambient temperature. Contrary to current systems there is provided a friction based counterbalance mechanism for coupling with a closure panel to assist in opening and closing of the closure panel for at least a portion of a path between a fully closed position and a fully open position of the closure panel, the counterbalance mechanism including: an elongate member positioned on a longitudinal axis extending between the proximal and distal ends of the counterbalance mechanism, the elongate member having a peripheral surface, the elongate member having a proximal end for coupling to one of the closure panel and a body of a vehicle; a travel member having a body and at least one friction member mounted on the body, the travel member positioned on the longitudinal axis for reciprocation there along and for providing contact between the at least one friction member and the peripheral surface, said contact for generating a friction force in a first region along the longitudinal axis and in a second region along the longitudinal axis; and a support member coupled to the travel element at a proximal end and for coupling at a distal end to the other of the closure panel and a body of a vehicle, the support member for guiding said reciprocation. The friction based counterbalance mechanism can be incorporated as part of a biasing strut such as a spring configured strut.

A first aspect provided is friction based counterbalance mechanism for coupling with a closure panel to assist in opening and closing of the closure panel for at least a portion of a path between a fully closed position and a fully open position of the closure panel, the counterbalance mechanism including: an elongate member positioned on a longitudinal axis extending between the proximal and distal ends of the counterbalance mechanism, the elongate member having a peripheral surface, the elongate member having a proximal end for coupling to one of the closure panel and a body of a vehicle; a travel member having a body and at least one friction member mounted on the body, the travel member positioned on the longitudinal axis for reciprocation there along and for providing contact between the at least one friction member and the peripheral surface, said contact for generating a friction force between the peripheral surface and the friction member; and a support member coupled to the travel element at a proximal end and for coupling at a distal end to the other of the closure panel and a body of a vehicle, the support member for guiding said reciprocation.

A second aspect provided is a counterbalance mechanism for coupling with a closure panel to assist in opening and closing of the closure panel for at least a portion of a path between a fully closed position and a fully open position of the closure panel, the counterbalance mechanism including: a housing having a proximal end for coupling the counterbalance mechanism to one of the closure panel and a body of a vehicle and a distal end for coupling the counterbalance mechanism to the other of the closure panel and the body of the vehicle; an elongate member mounted in the housing and positioned on a longitudinal axis extending between the proximal and distal ends of the housing, the elongate member having a peripheral surface, the elongate member having a proximal end coupled to the proximal end of the housing; a travel member having a body and at least one friction member mounted on the body, the travel member positioned on the longitudinal axis for reciprocation there along and for providing contact between the at least one friction member and the peripheral surface, said contact for generating a first friction force magnitude in a first region along the longitudinal axis and a second friction force magnitude different from the first friction force magnitude in a second region along the longitudinal axis, the first region spaced apart from the second region along the longitudinal axis; and a support member coupled to the travel member at a proximal end and coupled to the distal end of the housing at a distal end of the support member, the support member for guiding said reciprocation.

A third aspect provided is a friction based counterbalance mechanism for coupling with a closure panel to assist in opening and closing of the closure panel for at least a portion of a path between a fully closed position and a fully open position of the closure panel, the counterbalance mechanism including: an elongate member positioned on a longitudinal axis extending between the proximal and distal ends of the counterbalance mechanism, the elongate member having a peripheral surface, the elongate member having a proximal end for coupling to one of the closure panel and a body of a vehicle; a travel member having a body and at least one friction member mounted on the body, the travel member positioned on the longitudinal axis for reciprocation there along and for providing contact between the at least one friction member and the peripheral surface, said contact for generating a first friction force magnitude in a first region along the longitudinal axis and a second friction force magnitude different from the first friction force magnitude in a second region along the longitudinal axis, the first region spaced apart from the second region along the longitudinal axis; and a support member coupled to the travel element at a proximal end and for coupling at a distal end to the other of the closure panel and a body of a vehicle, the support member for guiding said reciprocation.

Other aspects, including methods of operation, and other embodiments of the above aspects will be evident based on the following description and drawings.

BRIEF DESCRIPTION OF THE DRAWINGS

Reference is made, by way of example only, to the attached figures, wherein:

FIG. 18a shows a further alternative embodiment of a front view of a travel member of the counterbalance mechanism shown in FIGS. 4 and 6;

FIG. 18b shows a further alternative embodiment of a front view of a travel member of the counterbalance mechanism shown in FIGS. 4 and 6;

FIG. 18c shows a further alternative embodiment of a side view of a travel member of the counterbalance mechanism shown in FIGS. 4 and 6;

FIG. 19 shows a further alternative embodiment of the counterbalance mechanism shown in FIGS. 4 and 6.

DETAILED DESCRIPTION OF EXAMPLE EMBODIMENTS

In this specification and in the claims, the use of the article "a", "an", or "the" in reference to an item is not intended to exclude the possibility of including a plurality of the item in some embodiments. It will be apparent to one skilled in the art in at least some instances in this specification and the attached claims that it would be possible to include a plurality of the item in at least some embodiments. Likewise, use of a plural form in reference to an item is not intended to exclude the possibility of including one of the item in some embodiments. It will be apparent to one skilled in the art in at least some instances in this specification and the attached claims that it would be possible to include one of the item in at least some embodiments.

Closure Panel Assembly 12 Examples

Provided is a counterbalance mechanism that can be used advantageously with vehicle closure panels to provide for open and close fail safe modes in the event of power actuator failure or disconnection, in particular for land-based, sea-based and/or air-based vehicles. Other applications of the counterbalance mechanism, in general for closure panels both in and outside of vehicle applications, include advantageously assisting in optimization of overall hold and manual effort forces for closure panel operation. It is recognized as well that the counterbalance mechanism examples provided below can be used advantageously as the sole means of open and close assistance for closure panels or can be used advantageously in combination (e.g. in tandem) with other closure panel biasing members (e.g. spring loaded hinges, biasing struts, etc.). In particular, the counterbalance mechanism can be friction based and used to provide a holding force (or torque) for the closure panel, as further described below. Further, it is recognized that the counterbalance mechanism can be integrated with a biasing member 37 such as a spring loaded strut and/or provided as a component of a closure panel assembly, as further described below. It is recognized that the biasing member 37, incorporating the friction based counterbalance mechanism, can be implemented as a strut (see FIGS. 8 and 14a,b,c,d as example types of struts). The strut can be of a biasing type (e.g. spring and/or gas charge supplying the bias). The strut can be of an electromechanical type (e.g. driven by an optional integrated motor assembly with spring and/or gas charge supplying a bias).

Figure 1:
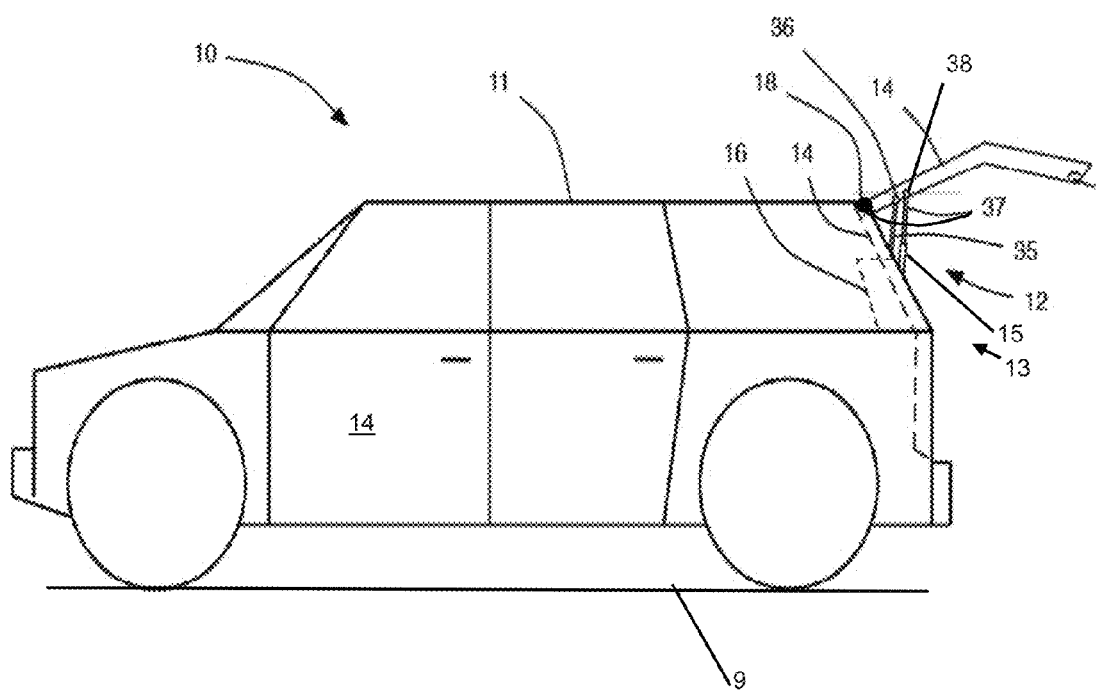
FIG. 1 is a side view of a vehicle with a closure panel assembly.

Referring to FIG. 1, shown is a vehicle 10 with a vehicle body 11 having one or more closure panels 14. One example configuration of the closure panel 14 is a closure panel assembly 12 including a friction based counterbalance mechanism 15 (e.g. incorporated in a biasing member 37 embodied as a strut by example) and a closure panel drive system 16 (e.g. incorporating an electrically powered motor/drive). For vehicles 10, the closure panel 14 can be referred to as a partition or door, typically hinged, but sometimes attached by other mechanisms such as tracks, in front of an opening 13 which is used for entering and exiting the vehicle 10 interior by people and/or cargo. It is also recognized that the closure panel 14 can be used as an access panel for vehicle 10 systems such as engine compartments and also for traditional trunk compartments of automotive type vehicles 10. The closure panel 14 can be opened to provide access to the opening 13, or closed to secure or otherwise restrict access to the opening 13. It is also recognized that there can be one or more intermediate hold positions of the closure panel 14 between a fully open position and fully closed position, as provided at least in part by the counterbalance mechanism 15 as further described below. For example, the counterbalance mechanism 15 can assist in biasing movement of the closure panel 14 away from one or more intermediate hold position(s), also known as Third Position Hold(s) (TPHs) or Stop-N-Hold(s), once positioned therein. It is also recognized that the counterbalance mechanism 15 can be provided as a component of the closure panel assembly 12, such that the counterbalance mechanism 15 component can be separate from the one or more biasing struts 37.

Friction Based Counterbalance Mechanism 15 Functionality

The closure panel 14 can be opened manually and/or powered electronically via the closure panel drive system 16, where powered closure panels 14 can be found on minivans, high-end cars, or sport utility vehicles (SUVs) and the like. Additionally, one characteristic of the closure panel 14 is that due to the weight of materials used in manufacture of the closure panel 14, some form of force assisted open and close mechanism (or mechanisms) are used to facilitate operation of the open and close operation by an operator (e.g. vehicle driver) of the closure panel 14. The force assisted open and close mechanism(s) is/are provided by the counterbalance mechanism 15, any biasing members 37 (e.g. spring loaded hinges, spring loaded struts, gas loaded struts, electromechanical struts, etc.) and the closure panel drive system 16 when used as part of the closure panel assembly 12, such that the counterbalance mechanism 15 is configured to provide a friction based holding torque (or force) that acts against the weight of the closure panel 14 on at least a portion of the panel open/close path about the third position hold, in order to help maintain the position of the closure panel 14 about the third position hold. It is recognized that an electromechanical strut can have a lead screw 140 (see FIGS. 14a,b,c,d) operated either actively (i.e. driven) by a motor (e.g. electrical) or operated passively such that the lead screw is free to rotate about its longitudinal axis due but is not actively driven by a motor. It is recognized that a travel member 45 (see FIG. 4,6) can be coupled to a It is recognized that the friction based counterbalance mechanism 15 can be configured as an independent counterbalance mechanism for the closure panel 14 and/or can be configured as a component of a biasing member 37 (e.g. incorporated as an internal component of a strut).

Figure 12:
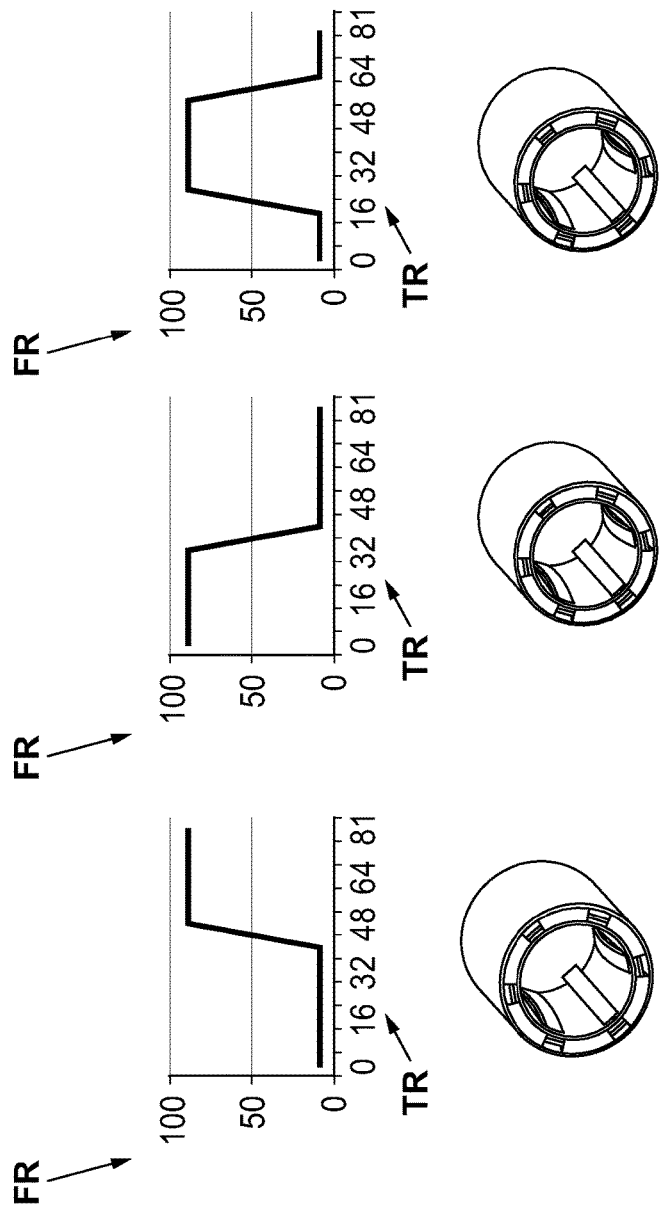
FIG. 12a,b,c shows example changes in friction force due to variations in at least one friction configuration parameter.

For example, the counterbalance mechanism 15 is configured to provide a friction based holding torque (or force) that acts against the weight of the closure panel 14 in order to maintain the open position of the closure panel 16 in a portion of the path defined as a third (e.g. intermediate) position hold range. As discussed, the friction based holding torque (or force) can be varied (e.g. in magnitude) across the full range of travel of the closure panel 14, thereby providing an advantage of generating the friction based holding torque (or force) that is variable in magnitude on different portions of the full range of travel of the closure panel 14 (see FIGS. 12a,b,c by example).

In another example the counterbalance mechanism 15 is configured to provide a friction based torque (or force) that acts against the opening torque (or force) of any biasing members 37 or the closure panel drive system 16 on at least a portion of the path between the intermediate hold position and the fully closed position. In another example the counterbalance mechanism 15 is configured to provide a friction based torque (or force) that acts against any closing torque (or force) of any biasing members 37 or the closure panel drive system 16 on at least a portion of the path between the intermediate hold position and the fully closed position. As discussed, the friction based holding torque (or force) can be varied (e.g. in magnitude) across the full range of travel of the closure panel 14, thereby providing an advantage of generating the friction based holding torque (or force) that is variable in magnitude on different portions of the full range of travel of the closure panel 14 (see FIGS. 12a,b,c by example).

In another example the counterbalance mechanism 15 is configured to provide a friction based torque (or force) that acts against the opening torque (or force) of any biasing members 37 or the closure panel drive system 16 on at least a portion of the path between the intermediate hold position and the fully open position. In another example the counterbalance mechanism 15 is configured to provide a friction based torque (or force) that acts against any closing torque (or force) of any biasing members 37 or the closure panel drive system 16 on at least a portion of the path between the intermediate hold position and the fully open position. As discussed, the friction based holding torque (or force) can be varied (e.g. in magnitude) across the full range of travel of the closure panel 14, thereby providing an advantage of generating the friction based holding torque (or force) that is variable in magnitude in different portions of the full range of travel of the closure panel 14 (see FIGS. 12a,b,c by example).

In another example the counterbalance mechanism 15 is configured to provide a friction based torque (or force) that acts against the opening torque (or force) of any biasing members 37 or the closure panel drive system 16 on at least a portion of the path between the fully open position and the fully closed position. In another example the counterbalance mechanism 15 is configured to provide a friction based torque (or force) that acts against the closing torque (or force) of any biasing members 37 or the closure panel drive system 16 on at least a portion of the path between the fully open position and the fully closed position. As discussed, the friction based holding torque (or force) can be varied (e.g. in magnitude) across the full range of travel of the closure panel 14, thereby providing an advantage of generating the friction based holding torque (or force) that is variable in magnitude on different portions of the full range of travel of the closure panel 14 (see FIGS. 12a,b,c by example).

Figure 3:
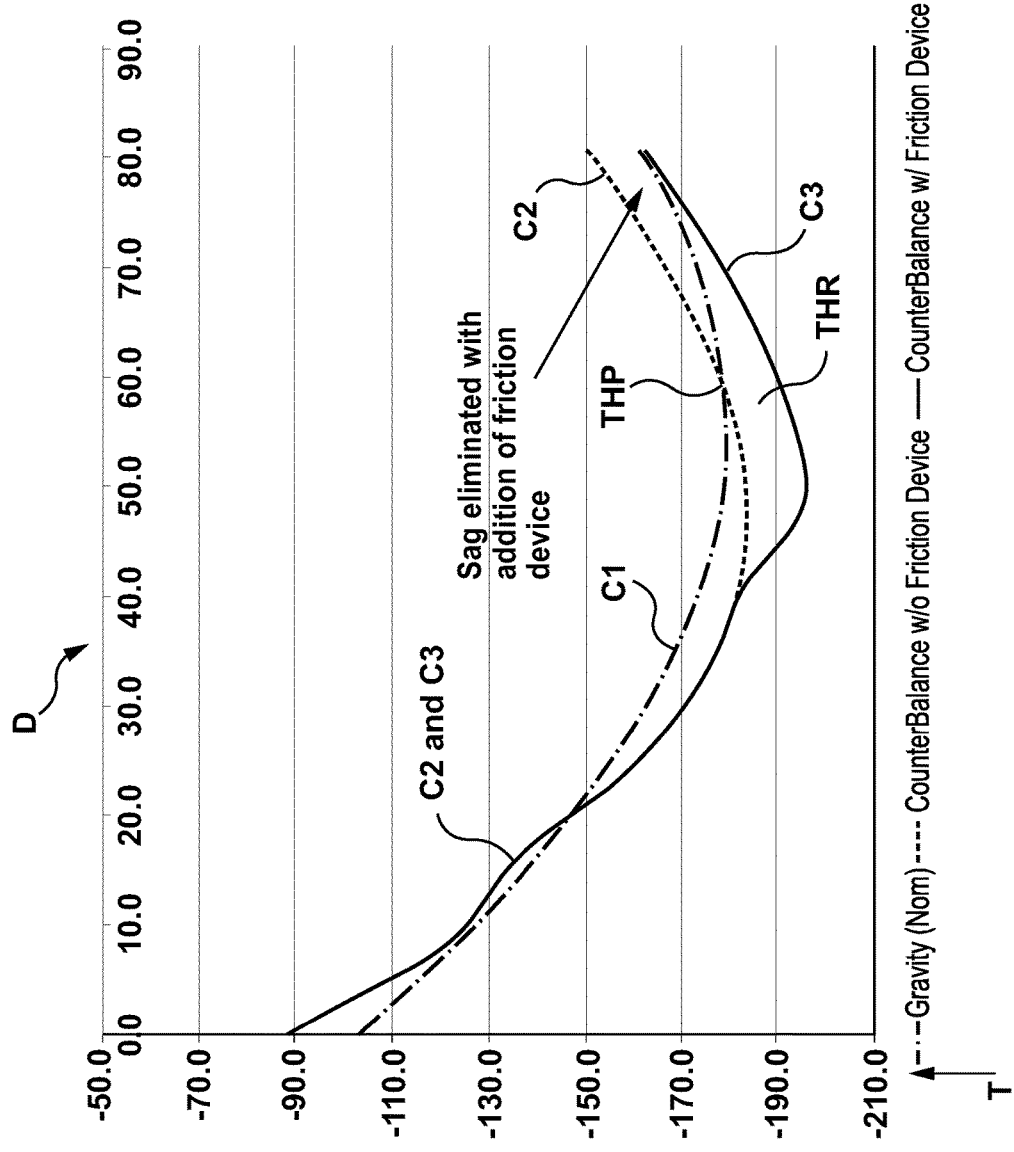
FIG. 3 is graph showing torque operational characteristics as a function of degree of opening for a friction counterbalance mechanism of the closure panel assembly shown in FIG. 1.

Referring to FIG. 3, shown is an example Output Curve verses Closure Panel Center of Gravity with torque T (magnitude) measured at the pivot axis 18 (see FIG. 1) verses degree of open (0 D represents fully closed and 80 D represents fully open positions), for torque T measured when the closure panel 14 is positioned at and degree of open D position. Noted are curve C1 representing the measure of torque T over degree open D contributed solely by the weight of the closure panel 14, curve C2 representing summary counterbalance torque T (e.g. contributed by biasing member (s) 37 and/or closure panel drive system 16) over degree open D without any contribution from the friction based counterbalance mechanism 15, and curve C3 representing summary counterbalance torque T (e.g. contributed by biasing member (s) 37 and/or closure panel drive system 16) over degree open D with contribution from the friction based counterbalance mechanism 15. As can be seen, the friction force FR (see FIG. 4) of the friction based counterbalance mechanism 15 between closed position (measured at 0 D) and open position approaching 40 D is configured, for example, so as to contribute little or no substantive friction force FR. Between approximately 40 D and 80 D, curve C2 and Curve C3 deviate from one another, as the friction based counterbalance mechanism 15 is configured to generate the friction force FR, thereby providing for the addition of the friction force FR equivalent for friction torque T to facilitate the combined counterbalance torque T (including torque T of the friction force FR) to be greater than the weight of the closure panel 14 itself as provided by the curve C1. To be clear, curve C2 represents the counterbalance torque T without inclusion of the friction based counterbalance mechanism 15, and therefore the counterbalance torque T provided along curve C2 is less than the weight torque T of the closure panel 14 as provided along curve C1, once the degree of open proceeds from approximately just after 60 D to the fully open position and approximately 80 D. As such, it is recognized that the closure panel 14 would sag for any degree of open greater than approximately 60 D when the friction based counterbalance mechanism 15 is not included (represented by curve C2) as part of the closure panel assembly 12.

As noted below, the friction force FR (see FIG. 4) generated by the friction based counterbalance mechanism 15 can be configured to vary in magnitude between one or more portions between the fully open position and fully closed (in dotted lines) of the closure panel 14 (see FIG. 1).

As can be seen, curve C1 is below curve C2 between 0 D and approximately 20 D open, which represents that torque T provided by the weight of the closure panel 14 is greater summary counterbalance torque T (e.g. contributed by biasing member (s) 37 and/or closure panel drive system 16) and therefore the closure panel 14 is biased towards the closed position unless additional opening torque is provided by manual effort from the vehicle operator and/or additional opening torque is provided by a kick start spring 53 (see FIG. 7b) as is known in the art. Once 20 D open position is achieved towards fully open, curve C2 is greater than curve C1 until approximately 58 D open position is reached, whereat point curve C2 and curve C1 intersect (referenced by "THP") which defines the third position hold point (e.g. summary counterbalance torque and panel weight torque are balanced) for the example configuration closure panel 14. Any positioning of the closure panel 14 beyond the approximately 58 D open position would result in sag (dropping back down towards closed position) of the closure panel 14 as the torque T provided by the weight of the closure panel 14 is greater summary counterbalance torque T (e.g. contributed by biasing member (s) 37 and/or closure panel drive system 16) and therefore the closure panel 14 is biased back towards the closed position unless additional opening torque is provided by manual effort from the vehicle operator to assist maintaining of the close panel 14 against travel back towards the third position hold point THP.

Alternatively and advantageously for curve C3, once torque T provided by the weight of the closure panel 14 begins to counteract the summary counterbalance torque T (at about 40 D), the resistive friction torque provided by the counterbalance mechanism 15 is added to the summary counterbalance torque T (e.g. contributed by biasing member (s) 37 and/or closure panel drive system 16 in order to keep the summary counterbalance torque T (e.g. contributed by biasing member (s) 37, the friction counterbalance mechanism 15 and/or closure panel drive system 16) greater than the torque T provided by the weight of the closure panel 14, thereby inhibiting sag for open positions of the closure panel 14 in a third position hold range (shown by shaded region TPR between curves CC and C1) between about 40 D to fully open at about 80 D. As such, it can be seen that when using the friction based counterbalance mechanism 15, the summary counterbalance torque T provided is inhibited from becoming less than the torque T provided by the weight of the closure panel 14, thus advantageously inhibiting sag over the upper degree open D range of the closure panel 14 travel.

Further to the above, in another example the counterbalance mechanism 15 is configured to provide a friction based torque (or force) that acts against the closing torque (or force) provided by the weight of the closure panel 14 on at least a portion of the path between the intermediate hold position and the fully closed position. In another example the counterbalance mechanism 15 is configured to provide a friction based torque (or force) that acts against the closing torque (or force) provided by the weight of the closure panel 14 on at least a portion of the path between the intermediate hold position and the fully open position. In another example the counterbalance mechanism 15 is configured to provide a friction based torque (or force) that acts against the closing torque (or force) provided by the weight of the closure panel 14 on at least a portion of the path between the fully closed position and the fully open position.

As discussed above, the counterbalance mechanism 15 is also configured to provide an opening torque (also referred to as an opening force) that acts against the weight of the closure panel 14 to bias the closure panel 14 towards the open position. Therefore it is recognized advantageously that the counterbalance mechanism 15 is configured to provide a resistive based opening torque (or force) that acts against the weight of the closure panel 14 to bias the closure panel 14 towards the open position (e.g. biased away from the fully closed position and towards the open position) and can also provide a closing torque (also referred to as a closing force) that acts with the weight of the closure panel 14 to bias the closure panel 14 towards the closed position (e.g. biased away from the fully open position and towards the closed position). Discussion of how resistive elements of the counterbalance mechanism 15 are configured is provided further below.

Closure Panel Assembly 12 Configuration

In terms of vehicles 10, the closure panel 14 may be a lift gate as shown in FIG. 1, or it may be some other kind of closure panel 14, such as an upward-swinging vehicle door (i.e. what is sometimes referred to as a gull-wing door) or a conventional type of door that is hinged at a front-facing or back-facing edge of the door, and so allows the door to swing (or slide) away from (or towards) the opening 13 in the body 11 of the vehicle 10. Also contemplated are sliding door embodiments of the closure panel 14 and canopy door embodiments of the closure panel 14, such that sliding doors can be a type of door that open by sliding horizontally or vertically, whereby the door is either mounted on, or suspended from a track that provides for a larger opening 13 for equipment to be loaded and unloaded through the opening 13 without obstructing access. Canopy doors are a type of door that sits on top of the vehicle 10 and lifts up in some way, to provide access for vehicle passengers via the opening 13 (e.g. car canopy, aircraft canopy, etc.). Canopy doors can be connected (e.g. hinged at a defined pivot axis and/or connected for travel along a track) to the body 11 of the vehicle at the front, side or back of the door, as the application permits.

Referring again to FIG. 1, in the context of a vehicle application of a closure panel by example only, the closure panel 14 is movable between a closed position (shown in dashed outline) and an open position (shown in solid outline). In the embodiment shown, the closure panel 14 pivots between the open position and the closed position about a pivot axis 18, which is preferably configured as horizontal or otherwise parallel to a support surface 9 of the vehicle 10. In other embodiments, the pivot axis 18 may have some other orientation such as vertical or otherwise extending at an angle outwards from the support surface 9 of the vehicle 10. In still other embodiments, the closure panel 14 may move in a manner other than pivoting, for example, the closure panel 14 may translate along a predefined track or may undergo a combination of translation and rotation between the open and closed position.

Referring again to FIG. 1, as discussed above, the counterbalance mechanism 15 examples provided below for the closure panel assembly 12 can be used as the sole means of open and close assistance for the inhibition of sag by the closure panels 14 themselves (see FIG. 2), or can be used in combination (e.g. in tandem or otherwise integrated) with one or more other closure panel biasing members 37 (e.g. spring loaded hinges, struts such as gas struts or spring loaded struts, etc.) that provide a primary connection of the closure panel 14 to the vehicle body 11 at a pivot connection 18,38 (see FIG. 1). In general operation of the closure panel 14, the closure panel drive system 16 can be coupled to a distal end of a link rod 35 (also referred to as lever mechanism or arm or element) used to connect the closure panel 14 as a secondary connection of the closure panel to the vehicle body 11, such that the closure panel biasing member 37 and the link rod 35 can be pivotally attached to the closure panel 14 at spaced apart locations as shown. In this manner, the other end of the link rod 35 pivotally connects to the closure panel 14 at pivot connection 36. It is recognized that the link rod 35 itself can be configured as a non-biasing element (e.g. a solid rod) or can be configured as a biasing element (e.g. a gas or spring assisted extension strut), as desired.

Referring again to FIG. 1, one or more optional closure panel biasing members 37 can be provided which urge the closure panel 14 towards the open position throughout at least some portion of the path between the open position and the closed position and which assist in holding the closure panel 14 in the open position. The closure panel biasing members 37 can be, for example, gas extension struts which are pivotally connected at their proximal end to the closure panel 14 and at their distal end to the vehicle body 11. In the embodiment shown, there are two biasing members 37 (one on the left side of the vehicle 10 and one on the right side of the vehicle 10), however one biasing member 37 is obscured by the other in the view shown. 10. In one example, see FIG. 13, the friction based counterbalance mechanism 15 can be coupled to the closure panel 14 on one side of the closure panel 14 as motorized biasing element 37, such that a support member 52 is a lead screw 140 (see FIG. 14a, 14b) actively driven by a motor 136 assembly, and a second counterbalance mechanism 15 is incorporated at another side of the closure panel 14 in a differently configured biasing element 37, such that the second counterbalance mechanism 15 is passively operated by motion of the closure panel 14.

As the closure panel 14 moves between the open and closed positions, the torques (or forces) exerted the on the closure panel 14 by the biasing members 37 and by the weight of the closure panel 14 itself will vary. In one embodiment, the closure panel 14 can have some position between the open and closed positions at which the torque (or force) exerted on the closure panel 14 by the biasing members 37 cancels out the torque (or force) exerted on the closure panel 14 by the weight of the closure panel 14 (i.e. the torque or force of the biasing member(s) 37 acts against the weight of the closure panel 14). Above this point (which can be referred to as a balance point or otherwise referred to as the intermediate hold position), the torque (or force) exerted by the biasing members 37 can overcome the torque (or force) exerted by the weight of the panel 14 thus resulting in a net torque (or force) away from the closed position, thus biasing the closure panel 14 towards the open position (i.e. the torque or force of the biasing member(s) 37 acts against the weight of the closure panel 14). Below this point, the torque (or force) exerted by the weight of the panel 14 can overcome the torque (or force) exerted by the biasing members 37 thus resulting in a net torque (or force) towards the closed position, thus biasing the closure panel 14 towards the closed position. However, even in travel of the closure panel 14 towards the closed position, the torque or force of the biasing member(s) 37 acts against the weight of the closure panel 14. In this manner, the effect of the biasing member(s) 37 is to provide a torque or force that always acts against the weight of the closure panel 14 (i.e. always supplies a closing torque or force). It is recognized that "3rd position hold" can also be referred to as an "intermediate hold position" or a "stop and hold position".

Figure 2:
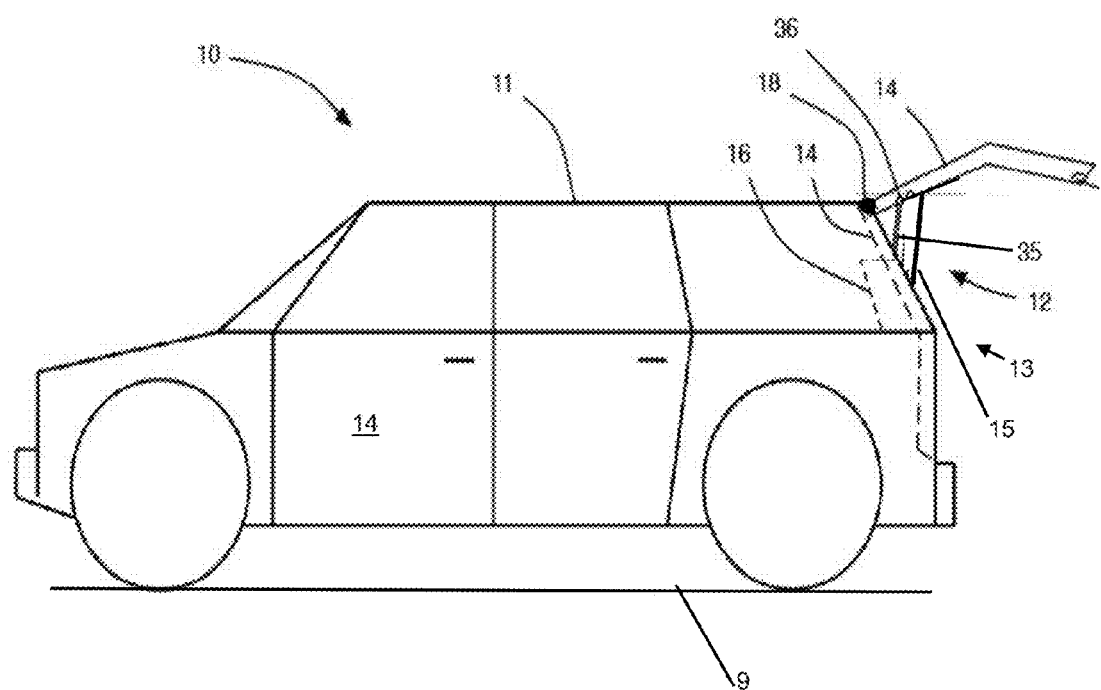
FIG. 2 is an alternative embodiment of the vehicle of FIG. 1.

Further to operation of the above-described optional closure panel biasing members 37, one or more counterbalance mechanisms 15 can be provided in addition to (as shown in FIG. 1) or in substitution of (as shown in FIG. 2) the biasing members 37. For example, in terms of FIG. 1, one or more counterbalance mechanisms 15 can be provided which act to maintain or otherwise inhibit the closure panel 14 from travelling towards the closed position, i.e. assist in holding the closure panel 14 in the open position (e.g. intermediate hold positions and/or the fully open position). The one or more counterbalance mechanisms 15 can be, for example, coupled to or otherwise mounted on the vehicle body 11 and pivotally connected to the closure panel 14.

As the closure panel 14 moves between the open and closed positions, the torques (or forces) exerted on the closure panel 14 by each counterbalance mechanism 15, the biasing members 37, and by the weight of the closure panel 14 itself can vary. In one embodiment, the closure panel 14 can have some position between the open and closed positions at which the combined torque (or force) exerted on the closure panel 14 by each counterbalance mechanism 15 and the biasing members 37 cancels out the torque (or force) exerted thereon by the weight of the panel 14. Above this point (which may be referred to as a balance point or otherwise referred to as the intermediate hold position), the combined torque (or force) exerted on the closure panel 14 by each counterbalance mechanism 15 and the biasing members 37 can overcome the torque (or force) exerted by the weight of the panel 14 itself thus resulting in a net torque (or force) away from the intermediate open position, thus restricting movement of the closure panel 14 towards the closed position. Below this point, the torque (or force) exerted by the weight of the panel 14 can overcome the combined torque (or force) exerted on the closure panel 14 by each counterbalance mechanism 15 and the biasing members 37 thus resulting in a net torque (or force) towards the fully closed position, thus biasing the closure panel 14 away from the intermediate open position.

Example Counterbalance Mechanism 15 Configurations

Figure 4:
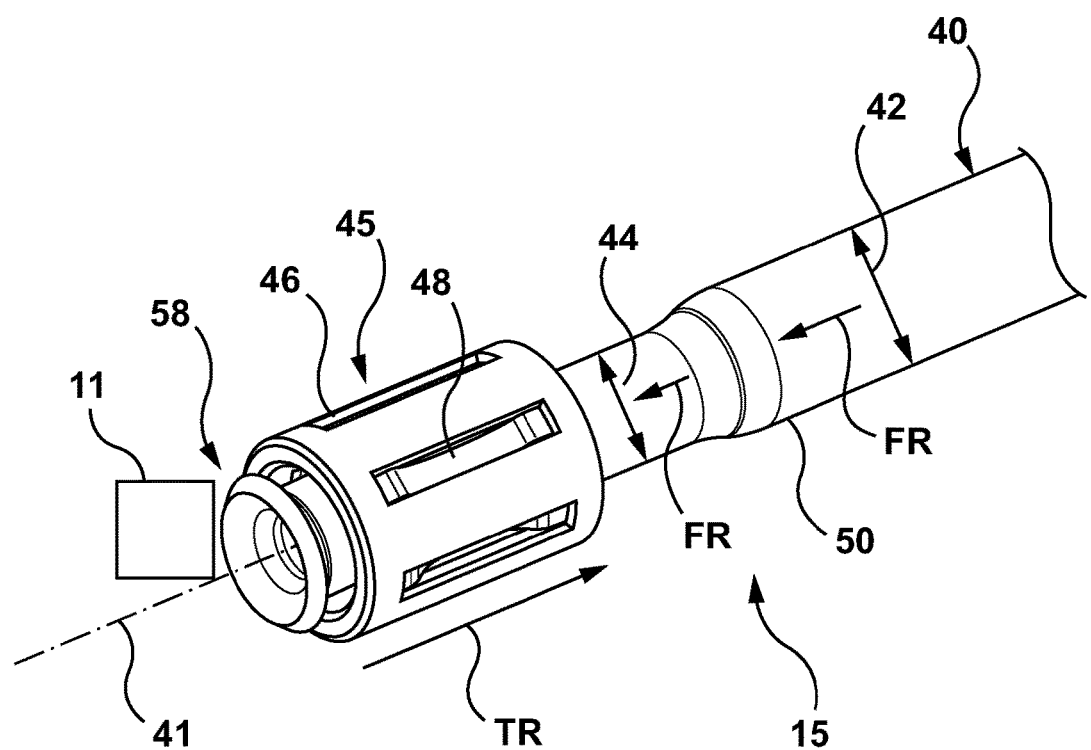
FIG. 4 is an example counterbalance mechanism with a variable friction device packaged of the closure panel assembly shown in FIG. 1.

Referring to FIG. 4, shown is an example configuration of the friction counterbalance mechanism 15 including an elongate member 40 (e.g. rod, tube, etc.) defining a longitudinal axis 41. The elongate member 40 can have a number of differing regions 42, 44 along the longitudinal axis 41. It is recognized that these differing regions 42, 44 have different friction force configuration parameters, such as but not limited to: varying diameter (for example the diameter or member width in region 42 could be different from the diameter or member width in region 44); varying surface 50 roughness contributing to variability in the coefficient of friction between the surface 50 in different regions 42,44 and a travel member 45 as further described below (for example the surface roughness in region 42 could be different from the surface roughness in region 44); varying contact surface area between the travel member 45 and the contact surface 50 (for example the contact area in region 42 could be different from the contact area in region 44); and/or varying contact pressure between the travel member 45 and the contact surface 50 (for example the contact pressure in region 42 could be different from the contact pressure in region 44). As such, it is recognized that the geometrical configuration and/or material surface 50 selection of the elongate member 40 and/or friction elements 48 of the travel member 45 can be selected so as to result in variability of the friction force FR (e.g. in magnitude) generated by the friction based counterbalance mechanism 15 as the attached closure panel 14 moves between the open and closed positions. A support member 52 can be coupled (e.g. FIG. 7a, 10) to the closure panel 14 (see FIG. 1) or the vehicle body 11 at a distal end and coupled to the travel member 45 at a proximal end, thus providing for the relative motion of the travel member 45 along the axis 41. Alternatively, the support member 532 can be provided as a lead screw 140 (e.g. FIG. 14a, 14c) that is coupled at one end to the travel member 45 (e.g. FIG. 14c), such that the travel member 45 rotates about the axis 41 at the end of the lead screw 140, and/or is coupled through (e.g. FIG. 14a) the travel member 45 (e.g. by threaded bore 161) and as such the travel member 45 rotates about and along the lead screw 140 as the travel member 45 travels along the longitudinal axis 41. It is also recognized that the travel member 45 does not rotate on the lead screw 140, rather the travel member 45 travels linearly along the longitudinal axis 41 and linearly along a body of the lead screw 140 as the lead screw 140 rotates about the longitudinal axis 41 and within the threaded bore 161.

Referring again to FIG. 4, shown only by example is variation in the friction force FR (e.g. in magnitude) generated due to variation in the diameter of the elongate member 40, however it is recognized that the differing regions could be alternately configured, as described above and below, in order to provide for variability (e.g. in magnitude) in the generated friction force FR.

Further to FIG. 4, for the example friction force variation parameter of changes in elongate member 40 diameter, shown is varying cross sectional dimension (e.g. the first diameter region 42 and the second diameter region 44), such that the first region 42 is of greater cross sectional dimension (e.g. diameter) than the cross sectional dimension of the second region 44. The intended result of the increase in diameter is to increase the friction force FR (e.g. in magnitude) when the travel member 45 travels in region 42 as compared to in region 44 (see FIG. 12a, where the magnitude of the friction force FR is greater in region 44 than in region 42). As such, the change in friction force FR between the regions 42,44 can be also caused due to change in other friction parameters (e.g. change the friction parameter between the regions 42,44 other than diameter, such as but not limited to change in contact surface area, change in coefficient of friction due to change in surface roughness, and/or change in contact pressure). Referring to FIG. 12b, for the example friction force variation parameter of changes in elongate member 40 diameter, shown is varying cross sectional dimension (e.g. the first diameter region 42 and the second diameter region 44), such that the first region 42 is of smaller cross sectional dimension (e.g. diameter) than the cross sectional dimension of the second region 44. The intended result of the decrease in diameter is to decrease the friction force FR (e.g. in magnitude) when the travel member 45 travels in region 42 as compared to in region 44 (see FIG. 12b, where the magnitude of the friction force FR is lower in region 44 than in region 42). As such, the change in friction force FR (e.g. in magnitude) between the regions 42,44 can be also caused due to change in other friction parameters (e.g. change the friction parameter between the regions 42,44 other than diameter, such as but not limited to change in contact surface area, change in coefficient of friction due to change in surface roughness, and/or change in contact pressure). Referring to FIG. 12c, for the example friction force variation parameter of changes in elongate member 40 diameter, shown is varying cross sectional dimension (e.g. the first diameter region 42 and the second diameter region 44 and a third region 43), such that the first region 42 is of smaller cross sectional dimension (e.g. diameter) than the cross sectional dimension of the second region 44 and the third region 43 is also of smaller dimension than the second region 44. The intended result of the increase and then decrease in diameter is to increase and then decrease the friction force FR (e.g. in magnitude) when the travel member 45 travels from region 42 to region 44 and then to region 43 (see FIG. 12c), where the magnitude of the friction force FR is greater in region 44 than in regions 42,43). As such, the change in friction force FR between the regions 42,43,44 can be also caused due to change in other friction parameters (e.g. change the friction parameter between the regions 42,43,44 other than diameter, such as but not limited to change in contact surface area, change in coefficient of friction due to change in surface roughness, and/or change in contact pressure).

Figure 5:
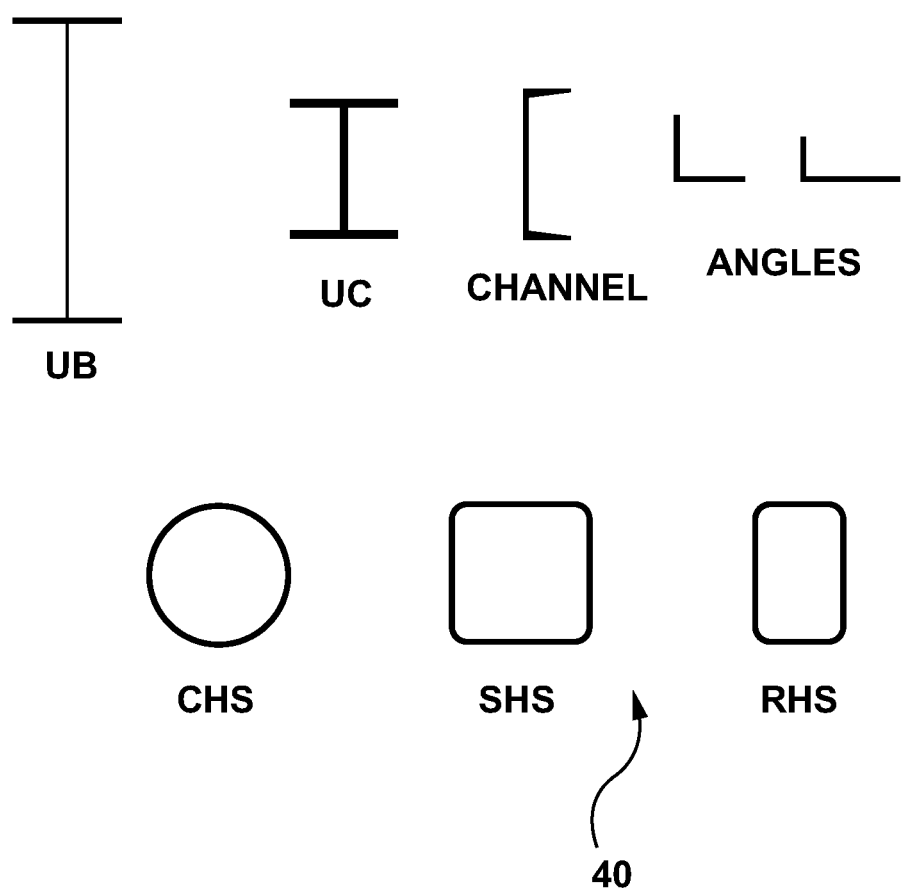
FIG. 5 shows alternative cross sectional embodiments of the counterbalance mechanism shown in FIG. 4.

Referring again to the example of change in diameter of the elongate member 40 shown in FIG. 4. The travel member 45 (e.g. a cage) has a body 46 and one or more friction elements 48 (e.g. a leaf spring) is positioned on the elongate member 40 and configured to reciprocate (e.g. travel TR) along the longitudinal axis 41 of the elongate member 40. The friction element(s) 48 can be configured as fixed in position on the body 46 while also being able to move relative to the body 46 in response to variations in the cross sectional dimension (e.g. diameter), as compared to variation in any other selected friction parameter, of the different regions 42,44 of the elongate member 40. It is recognized that the cross sectional dimension can be of any shape desired, for example circular (e.g. diameter as shown), quadrilateral (e.g. square, rectangular), ovoid, or others as shown by example in FIG. 5.

Figure 6:
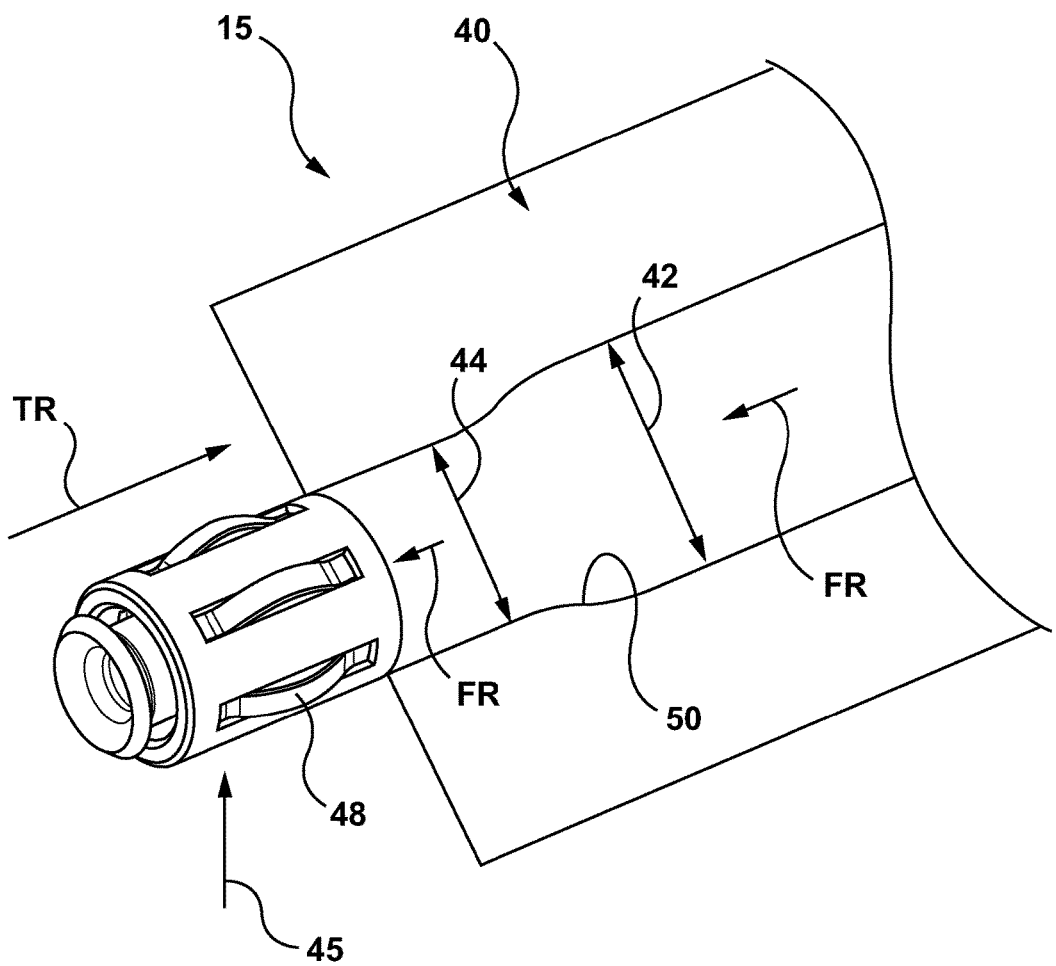
FIG. 6 shows an alternative embodiment of the counterbalance mechanism shown in FIG. 4.

In the example shown in FIG. 4, the elongate member 40 supports the travel member 45 on an exterior peripheral surface 50 (e.g. the travel member 45 is positioned for reciprocation on the exterior surface 50 of the elongate member 40). Referring to FIG. 6, shown is an alternative embodiment of the friction counterbalance mechanism 15 having the travel member 45 supported on an interior peripheral surface 50 of the elongate member 40 configured as a hollow tube (e.g. the travel member 45 is positioned for reciprocation on the interior surface 50 of the elongate member 40). As such, different configurations of the travel member 45 and elongate member 40 are contemplated by the friction counterbalance mechanism 15 including different cross sectional shapes as well as internal and/or external peripheral surfaces 50 for contact with the friction elements 48. In the example shown in FIG. 6, travel from region 44 to region 42 would result in a decrease in the friction force FR (e.g. in magnitude) due to an increase (i.e. a change) in the friction configuration parameter (e.g. diameter of member width) of the regions 42,44 of the elongate member 40.

Therefore, as the travel member 45 travels TR along the elongate member 40, the friction element(s) 48 contact the surface 50 of the elongate member 40, thus causing the generation of a friction force FR (see FIGS. 4 and 6) due to the combined configuration of friction configuration parameters (e.g. a selected coefficient of friction, selected contact pressure, selected contact area) between the friction element(s) 48 and the surface 50. In a cross sectional region 42 of greater cross section dimension for external surfaces 50 (see FIG. 4), it is expected that the friction force FR would be greater than in a cross sectional region 42 of lesser cross section dimension. Alternatively, in a cross sectional region 42 of lesser cross section dimension for internal surfaces 50 (see FIG. 6), it is expected that the friction force FR would be greater than in a cross sectional region 42 of greater cross section dimension. As such, it is recognized that the friction force FR produced between contact between the friction element(s) 48 and the surface 50 can be variable along the longitudinal axis 41 of the elongate member 40 as the cross sectional dimension (e.g. diameter) is varied (or any one of or any two or more of the friction configuration parameters are varied).

Figure 7A:
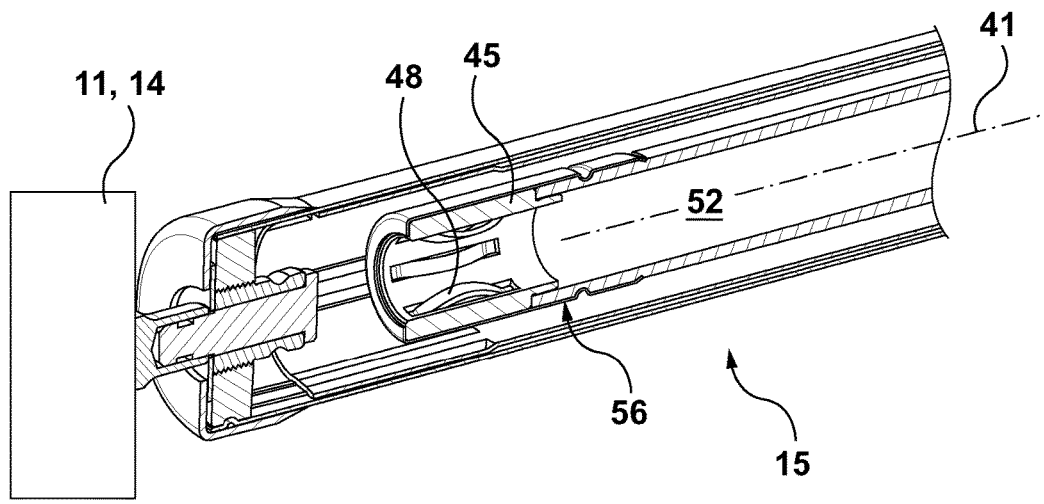
FIGS. 7a,7b show further details of the counterbalance mechanism shown in FIG. 4.
Figure 7B:
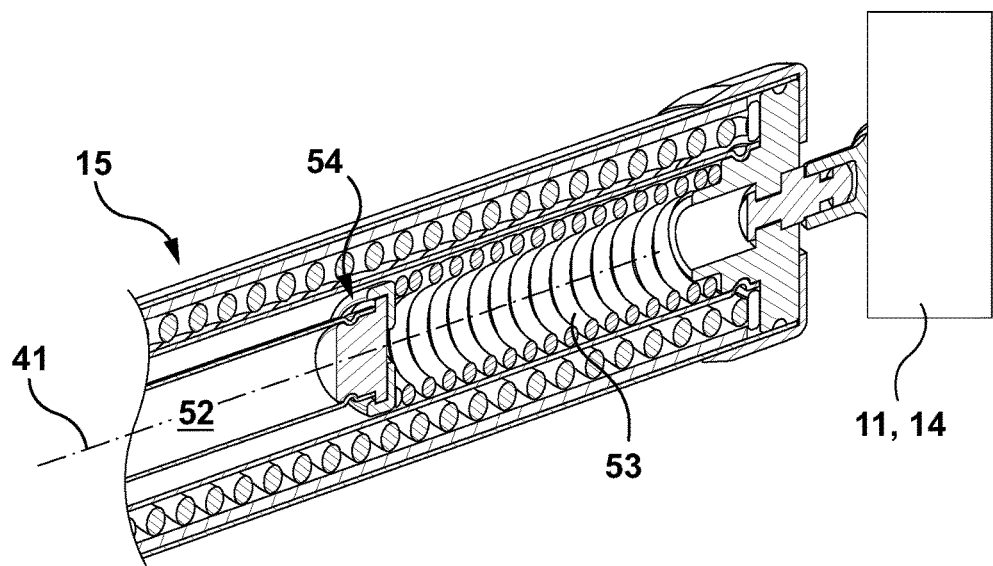
Figure 8:
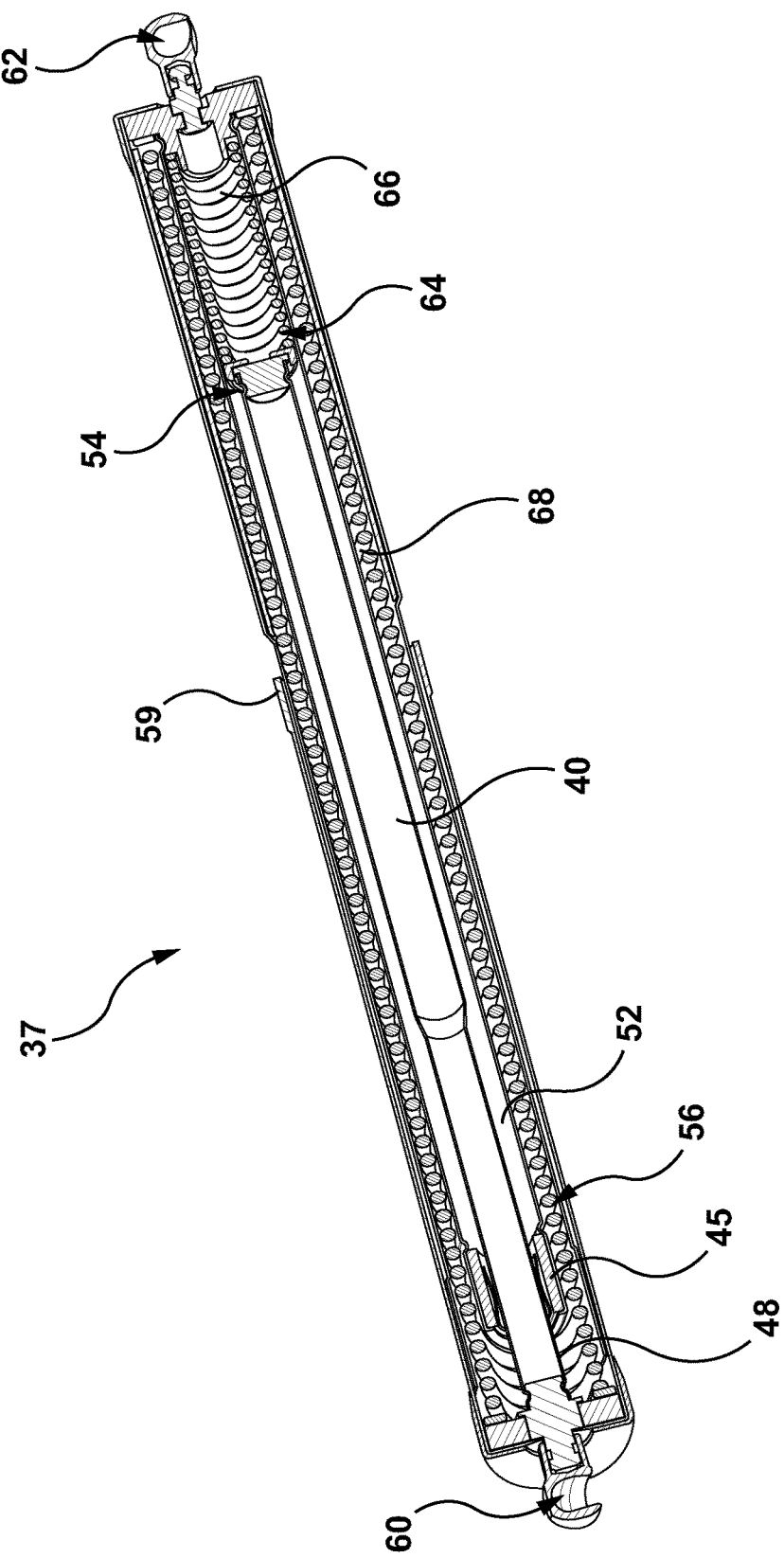
FIG. 8 shows an example application of the counterbalance mechanism shown in FIG. 4 for a biasing strut.

Referring to FIGS. 7a,7b, 8, shown is the counterbalance mechanism 15 with the elongate member 40 not shown for ease of explanation. As such, the travel member 45 with the friction element(s) 48 is positioned on a support member 52. The support member 52 is coupled (in this example case via a mounted kicker spring 53) to the closure panel 14 (see FIG. 1) or the vehicle body 11 at a distal end 54 and is coupled to the travel member 45 at a proximal end 56. Complimentary, the elongate member 40 is coupled to the vehicle body 11 or the closure panel 14. As such, as the support member 52 is displaced along the longitudinal axis 41, the attached travel member 45 is displaced along the elongate member 40 (see FIG. 4). For example, a proximal end 58 (see FIG. 4) of the elongate member 40 can be fixedly coupled to the vehicle body 11 and the distal end 54 of the support member 52 can be fixedly coupled to the closure panel 14 (see FIG. 7b). As such, as the closure panel 14 is moved between the open and closed positions (see FIG. 1), the distance between the proximal end 58 of the elongate member 40 and the distal end 54 of the support member 52 varies, thereby providing for reciprocation of the travel member 45 along the longitudinal axis 41 of the elongate member 40. As the travel member 45 moves (or tends to move), the frictional element(s) 48 generate the friction force FR. It is recognized that the friction force FR can be defined as dry friction which resists relative lateral (and/or rotational) motion of two solid surfaces in contact. Dry friction is subdivided into static friction ("stiction") between non-moving surfaces, and kinetic friction between moving surfaces. Therefore, the friction force FR generated between the friction element(s) 48 and the surface 50 would be a static friction force FR when the closure panel 14 is held stationary in the third position hold range THR (see FIG. 3). Alternatively, the friction force FR generated between the friction element(s) 48 and the surface 50 would be a kinetic friction force FR when the closure panel 14 is moving between the open and closed positions both within and outside of the third position hold range THR (see FIG. 3).

Further to the above, the magnitude of the friction force FR can be influenced by factors of such as but not limited to: the nature of the materials in contact (defining the magnitude of the coefficient of friction between the resistive element(s) 48 and the surface 50) and their surface nature or coatings (for example different regions 42,43,44 can have differencing surface coatings exhibiting different coefficients of friction with the resistive elements 48); the extent of the surface area of contact between the resistive element(s) 48 and the surface 50 such that greater surface area is proportional to a greater friction force FR (for example some regions 42,43, 44 of the elongate member can be configured such that the respective peripheral surface 50 at the respective region 42,44 contacts a greater number or a lesser number—a different number of resistive element(s) 48—than compared to another one of the regions 42,43,44, thus providing in a change in surface area contact between different regions 42,44); and/or the normal pressure (or load—e.g. normal force), for example as represented by the change in cross sectional dimension between different regions 42,43,44 (e.g. greater normal force between the surface of the leaf springs 48 and the surface 50 for region diameter 44 as compared to region diameter 42 for the counterbalance mechanism 15 shown in FIG. 4. The normal force can be defined as the net force compressing two parallel surfaces together; and its direction is perpendicular to the surfaces (i.e. surface of the friction element 48 in contact with the surface 50 of the elongate member 40).

Further, it is recognized that direction of the frictional force FR against the surface 48,50 is opposite to the motion that surface 48,50 would experience in the absence of friction. Thus, in the static case, the frictional force FR is exactly what it must be in order to prevent motion between the surfaces 48,50; such that the friction force FR balances the net force tending to cause such motion. In this case, rather than providing an estimate of the actual frictional force FR, the Coulomb approximation provides a threshold value for this force FR, above which motion would commence (i.e. the closure panel 14 would sag). This maximum friction force FR is known as traction. Further, it is recognized that the force of friction FR is always exerted in a direction that opposes movement (for kinetic friction) or potential movement (for static friction) between the two surfaces (contact between friction element 48 and surface 50).

It is also recognized that the coefficient of friction (COF), often is a dimensionless scalar value which describes the ratio of the force of friction FR between two bodies (e.g. surface 50 and friction element 48) and the force pressing them together (i.e. normal force). The coefficient of friction depends on the materials used for the surfaces in contact. Coefficients of friction can range from near zero to greater than one. For surfaces at rest relative to each other the COF is the coefficient of static friction. This static COF is usually larger than its kinetic counterpart. For surfaces in relative motion the COF is the coefficient of kinetic friction.

Figure 14A:
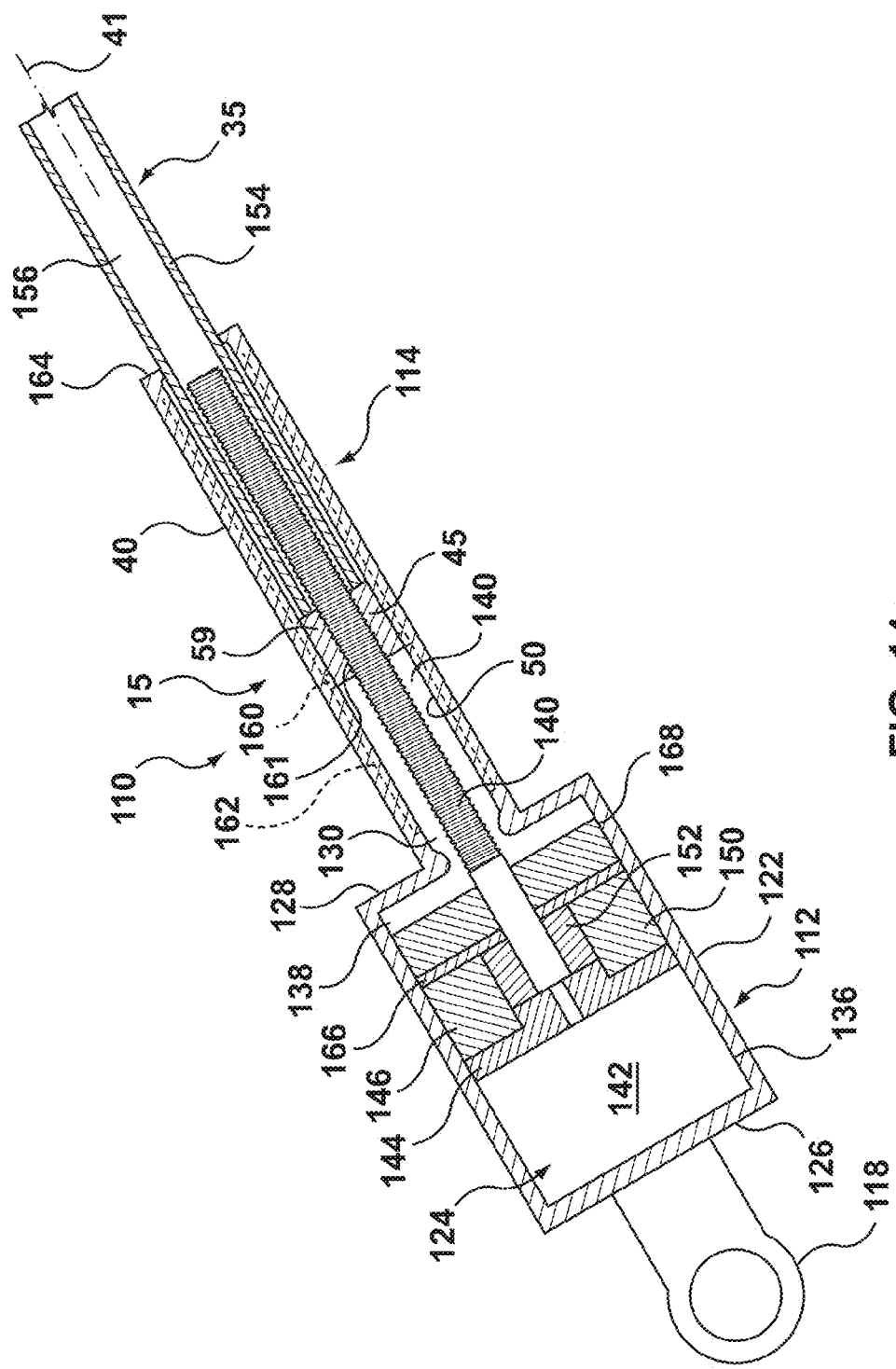
FIGS. 14a,b,c,d show alternative embodiments of the biasing strut of FIG. 10.
Figure 14B:
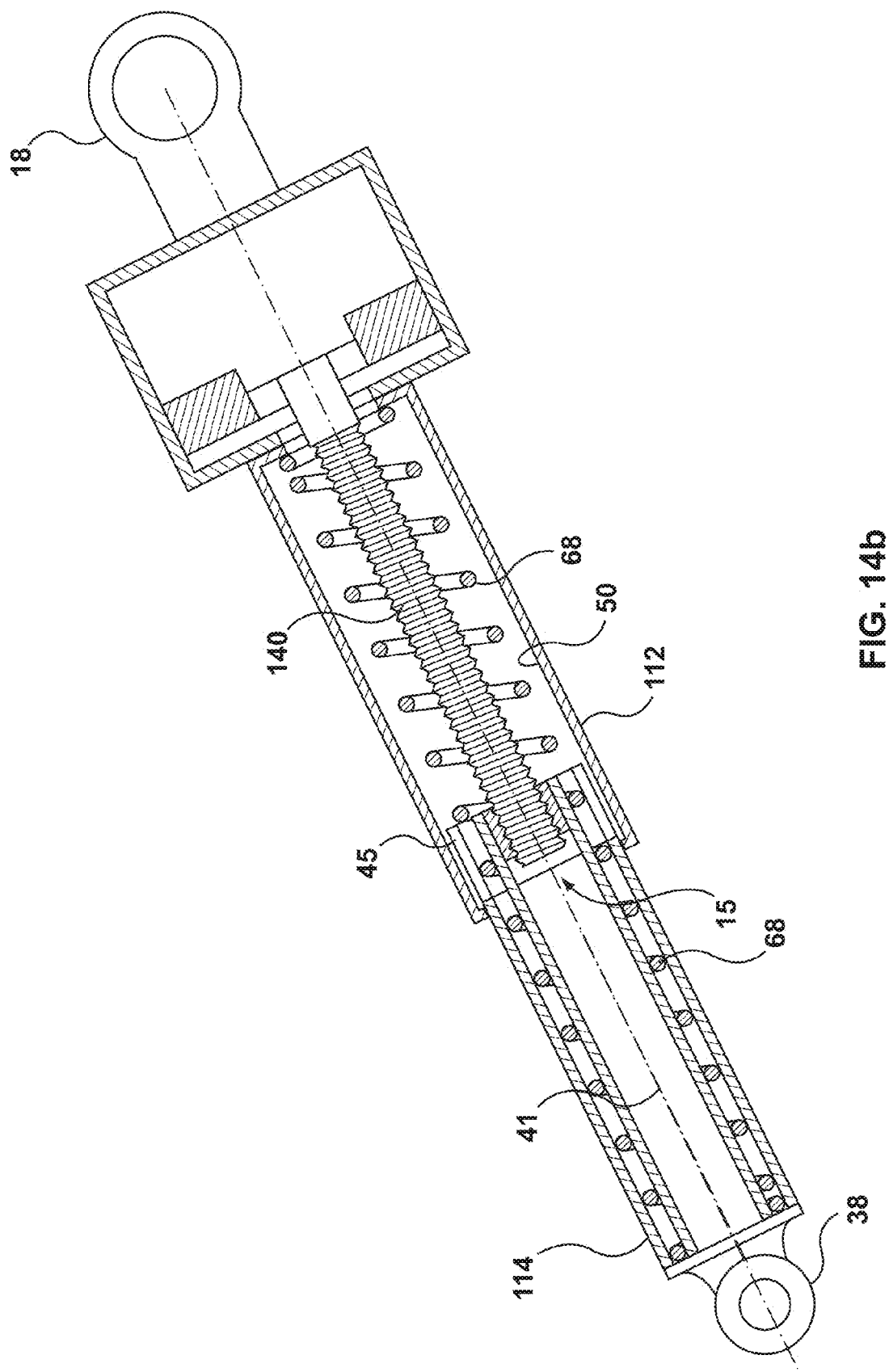
Figure 14C:
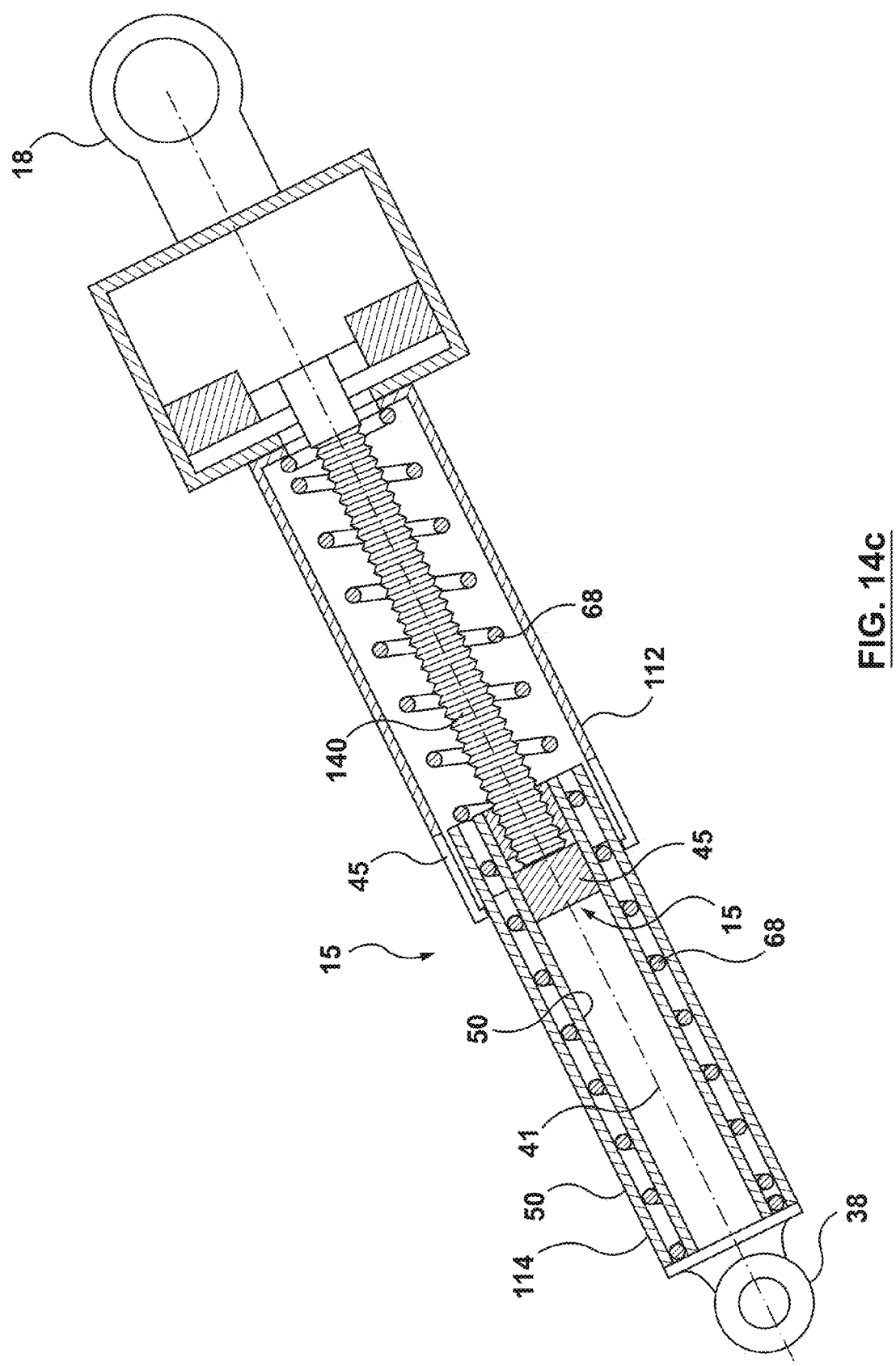
Figure 14D:
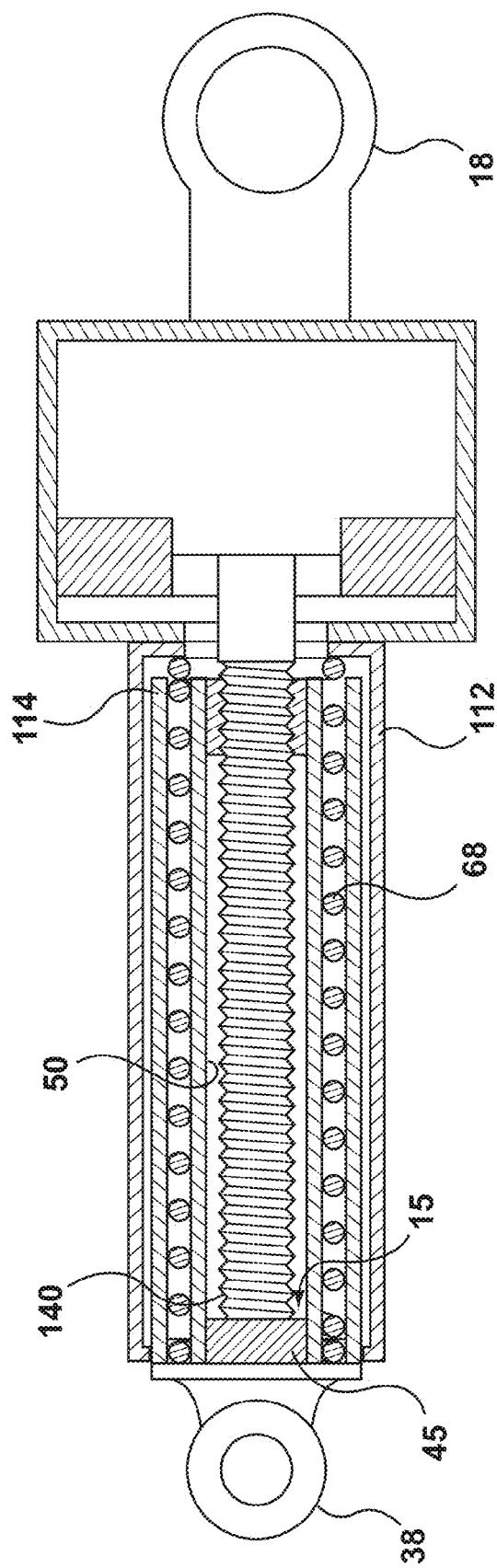
Figure 15A:
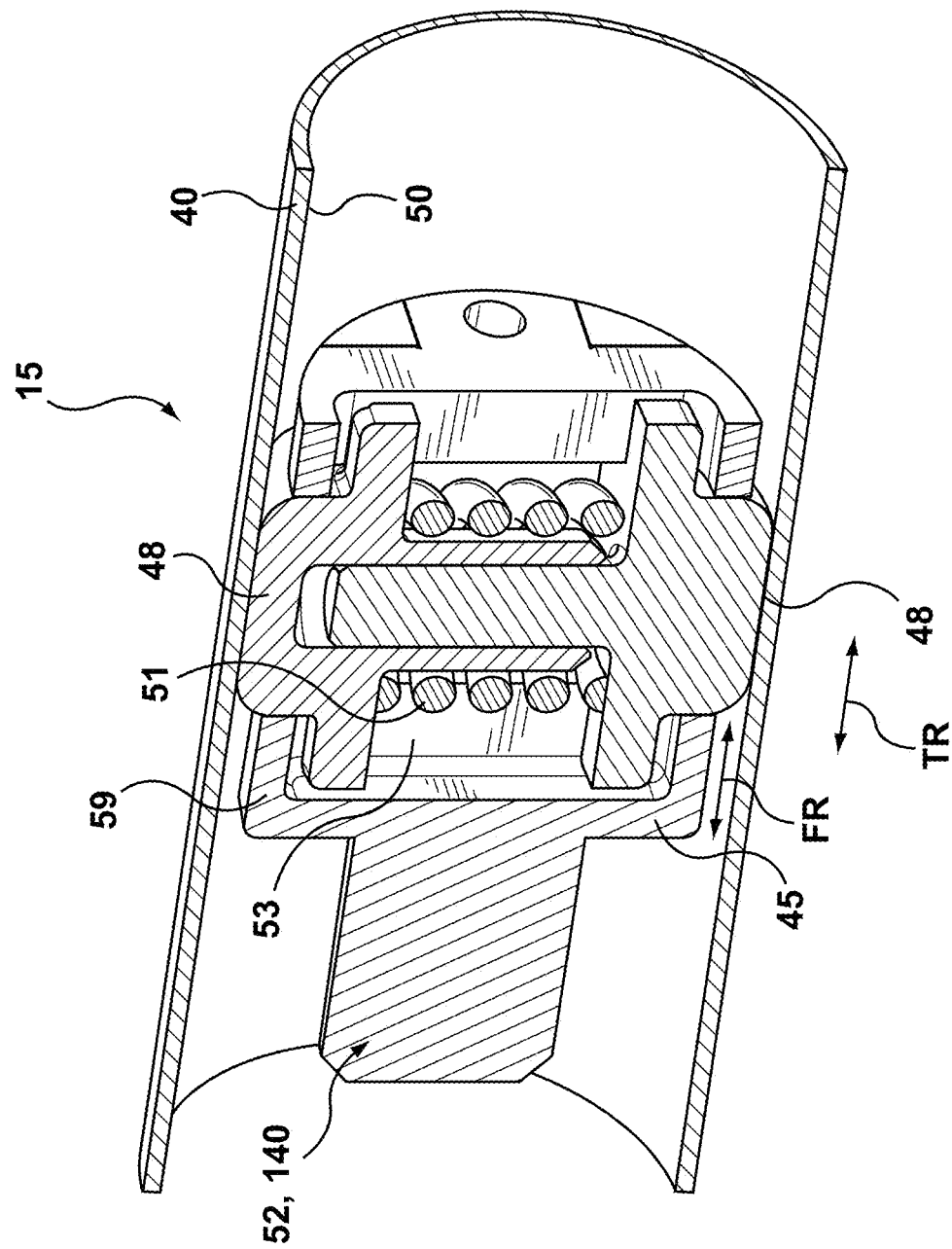
FIG. 15a shows a further alternative embodiment of the counterbalance mechanism shown in FIGS. 4 and 6.

Referring to FIG. 15a, shown is an alternative embodiment of the friction counterbalance mechanism 15 having the travel member 45 supported by support member 52 (or lead screw 140) on an interior peripheral surface 50 of the elongate member 40 configured as a hollow tube (e.g. the travel member 45 is positioned for reciprocation on the interior surface 50 of the elongate member 40). As such different configurations of the travel member 45 and elongate member 40 are contemplated by the friction counterbalance mechanism 15 including different cross sectional shapes as well as internal and/or external peripheral surfaces 50 for contact with the friction elements 48. The frictional elements 48 can be a pair of pads 48 biased away from one another and into contact with the peripheral surface 50 by one or more biasing members 51 (e.g. a spring shared between the pair of pads 48), as mounted internal to the body 59 of the travel member 45. It is recognized that that body 59 can be coupled to the lead screw 140 (see FIG. 14a, 14c, 14d) and/or can be coupled to one or more portions of the housing 112,114 (see FIG. 14b, 14c).

Therefore, as the travel member 45 travels TR along the elongate member 40 (as pushed/pulled by support member 52 or lead screw 140), the friction element(s) 48 contact the surface 50 of the elongate member 40, thus causing the generation of a friction force FR due to the combined configuration of friction configuration parameters (e.g. a selected coefficient of friction, selected contact pressure also referred to as normal force, and/or selected contact area, etc.) between the friction element(s) 48 and the surface 50. In a cross sectional region 42 of greater cross section dimension for external surfaces 50 (see FIG. 4), it is expected that the friction force FR would be greater in magnitude than in a cross sectional region 42 of lesser cross section dimension. Alternatively, in a cross sectional region 42 of lesser cross section dimension for internal surfaces 50 (see FIG. 6), it is expected that the friction force FR would be greater in magnitude than in a cross sectional region 42 of greater cross section dimension. As such, it is recognized that the friction force FR produced between contact between the friction element(s) 48 and the surface 50 can be variable in magnitude along the longitudinal axis 41 of the elongate member 40 as the cross sectional dimension (e.g. diameter) is varied (or any one of or any two or more of the friction configuration parameters are varied). In movement of the travel member 45, the opposed brake pads 48 can slide between each over and inside slots 53 of the body 59. Spring 51 compresses at assembly process of the travel member 45 and thus contributes to the selection and configuration of the magnitude amount of friction force FR generated between pads 48 and the surface 50. For example, this friction force FR can be function of relative translational and/or relative rotational movement (in the case of a rotating travel member 45—for example under influence of the power screw 140 of FIG. 14a,d) between surface 50 and travel member 45 if surface 50 has variable internal cross sectional dimension such as diameter (see FIG. 6). One advantage of this friction brake mechanism shown in FIG. 15 is that friction surfaces of pads 48 and peripheral surface 50 envelope each over, which can reduce contact stresses and wear of mating parts and helps generate the relatively large friction forces with small space of travel member 45. Further, it is recognized that the pads 48 of the travel member embodiment shown in FIG. 15 can be configured as shown in FIG. 4, such that the elongate member 40 supports the travel member 45 on an exterior peripheral surface 50 (e.g. the travel member 45 is positioned for reciprocation on the exterior surface 50 of the elongate member 40) and the pads 48 would be biased (e.g. via one or more springs 51) towards one another and thus towards the exterior peripheral surface 50 upon which the body is mounted for motion along (and optionally around).

Figure 15B:
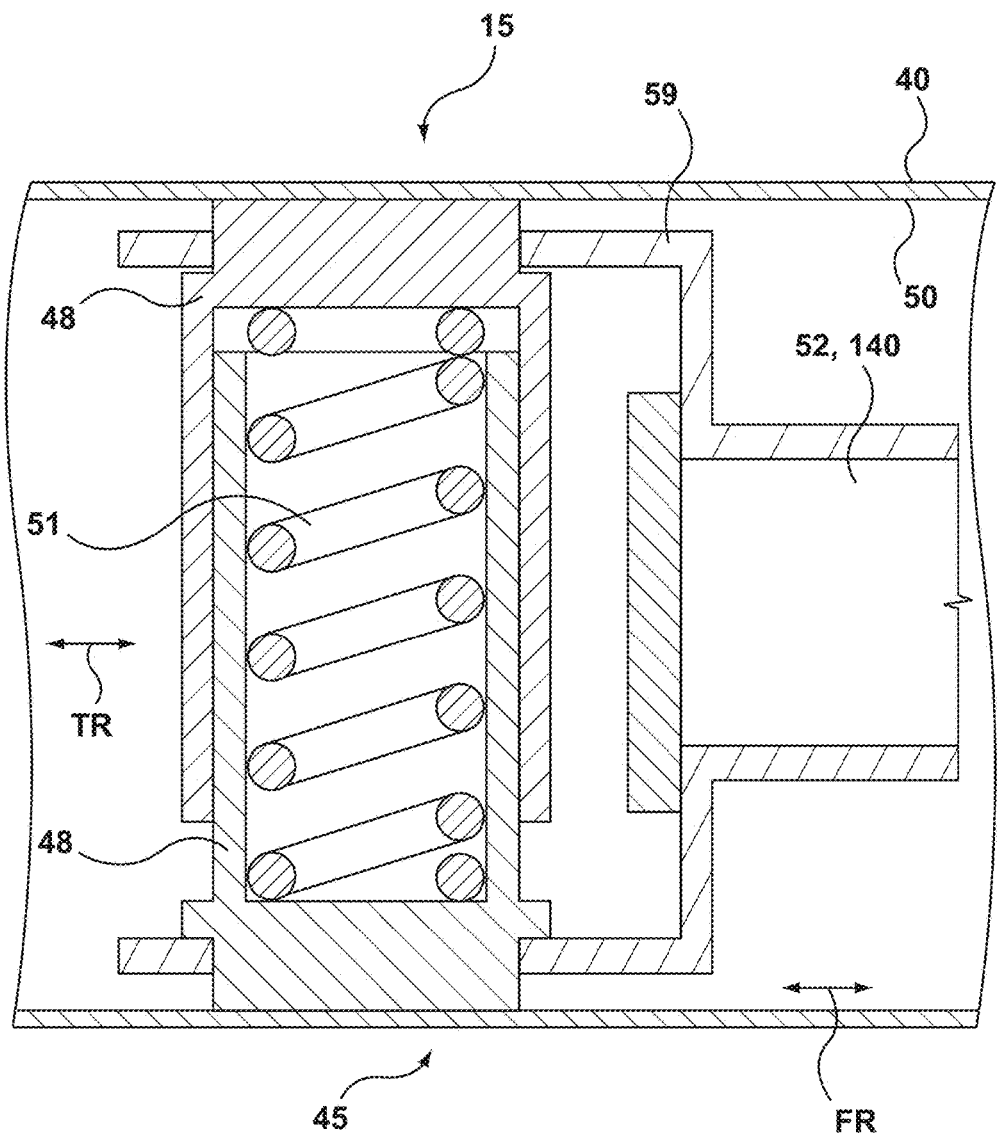
FIG. 15b shows a further alternative embodiment of the counterbalance mechanism shown in FIGS. 4 and 6.

Referring to FIG. 15b, shown is an alternative embodiment of the friction counterbalance mechanism 15, of FIG. 15a, having the travel member 45 supported by support member 52 (or lead screw 140) on an interior peripheral surface 50 of the elongate member 40 configured as a hollow tube (e.g. the travel member 45 is positioned for reciprocation on the interior surface 50 of the elongate member 40 as pushed/pulled by support member 52 or lead screw 140). As such, different configurations of the travel member 45 and elongate member 40 are contemplated by the friction counterbalance mechanism 15 including different cross sectional shapes as well as internal and/or external peripheral surfaces 50 for contact with the friction elements 48. The frictional elements 48 can be a pair of pads 48 biased into away from one another and into contact with the peripheral surface 50 by one or more biasing members 51 (e.g. a spring shared between the pair of pads 48), as mounted internal to the body 59 of the travel member 45.

Figure 16A:
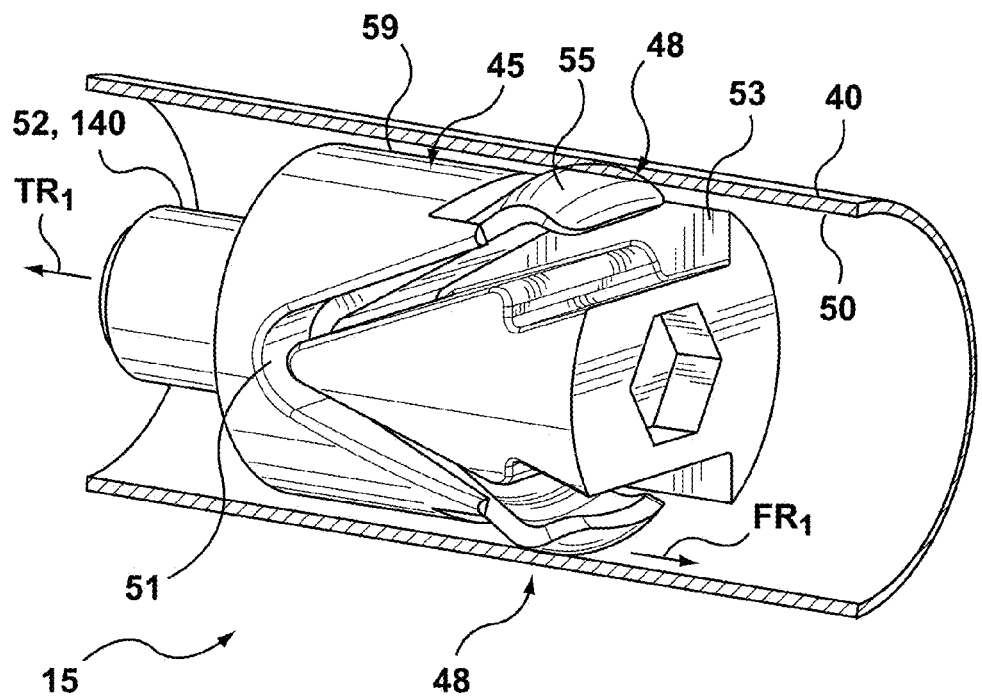
FIGS. 16a,b show a further alternative embodiment of the counterbalance mechanism shown in FIGS. 4 and 6.

Referring to FIGS. 16a,b, shown is an alternative embodiment of the friction counterbalance mechanism 15 having the travel member 45 supported by support member 52 (or lead screw 140) on an interior peripheral surface 50 of the elongate member 40 configured as a hollow tube (e.g. the travel member 45 is positioned for reciprocation on the interior surface 50 of the elongate member 40 as pushed/pulled by support member 52 or lead screw 140). As such, different configurations of the travel member 45 and elongate member 40 are contemplated by the friction counterbalance mechanism 15 including different cross sectional shapes as well as internal and/or external peripheral surfaces 50 for contact with the friction elements 48. The frictional elements 48 can be a pair of leaf spring inserts 48 biased away from one another and into contact with the peripheral surface 50 by one or more spring body 51, as mounted internal to the body 59 of the travel member 45.

Therefore, as the travel member 45 travels TR along the elongate member 40, the friction element(s) 48 contact the surface 50 of the elongate member 40, thus causing the generation of a friction force FR1,FR2 due to the combined configuration of friction configuration parameters (e.g. a selected coefficient of friction, selected contact pressure also referred to as normal force, and/or selected contact area, etc.) between the friction element(s) 48 and the surface 50.

In a cross sectional region 42 of greater cross section dimension for external surfaces 50 (see FIG. 4), it is expected that the friction force FR1,FR2 magnitude would be greater than in a cross sectional region 42 of lesser cross section dimension. Alternatively, in a cross sectional region 42 of lesser cross section dimension for internal surfaces 50 (see FIG. 6), it is expected that the friction force FR1,FR2 magnitude would be greater than in a cross sectional region 42 of greater cross section dimension. As such, it is recognized that the friction force FR1,FR2 magnitude produced between contact between the friction element(s) 48 and the surface 50 can be variable along the longitudinal axis 41 of the elongate member 40 as the cross sectional dimension (e.g. diameter) is varied (or any one of or any two or more of the friction configuration parameters are varied).

In movement of the travel member 45, the opposed leaf spring inserts 48 can reside inside slots 53 of the body 59. Spring 51 compresses at assembly process of the travel member 45 and thus contributes to the selection and configuration of the amount of friction force FR1, FR2 generated between leaf spring inserts 48 and the peripheral surface 50. For example, this friction force FR1,FR2 magnitude can be function of relative translational and/or relative rotational movement (in the case of a rotating travel member 45—for example under influence of the power screw 140 of FIG. 14) between surface 50 and travel member 45 if surface 50 has variable internal diameter (see FIG. 6). It is noted that the friction force magnitude FR1 would be less than friction force magnitude FR2, based on the differing linear (e.g. stroke) direction of travel TR1 and TR2. As for direction TR1, friction between the surface 50 and surface 55 would cause the opposed leaf spring inserts 48 to be forced towards one another and into their respective slots 53 against the bias provided by the spring 51. This is in comparison to the direction TR2, as friction between the surface 50 and surface 55 would cause the opposed leaf spring inserts 48 to be forced away from one another and out of their respective slots 53 (hence working with the bias provided by the spring 51) to generate a greater normal force (and hence corresponding friction force magnitude FR2) between the surfaces 50,55 than that for opposite travel direction TR1. As such, the friction based counterbalance mechanism 15 shown in FIG. 16*a,b* provides for differencing magnitudes of the friction force FR1,FR2, depending upon the relative linear direction of travel of the travel member 45 along the longitudinal axis 41 (i.e. travel direction TR1 is opposite to travel direction TR2. Further, it is recognized that the leaf spring inserts 48 of the travel member embodiment shown in FIG. 16*a,b* can be configured as shown in FIG. 4, such that the elongate member 40 supports the travel member 45 on an exterior peripheral surface 50 (e.g. the travel member 45 is positioned for reciprocation on the exterior surface 50 of the elongate member 40) and the leaf spring inserts 48 would be biased (e.g. via one or more springs 51) towards one another and thus towards the exterior peripheral surface 50 upon which the body is mounted for motion along (and optionally around).

Figure 17A:
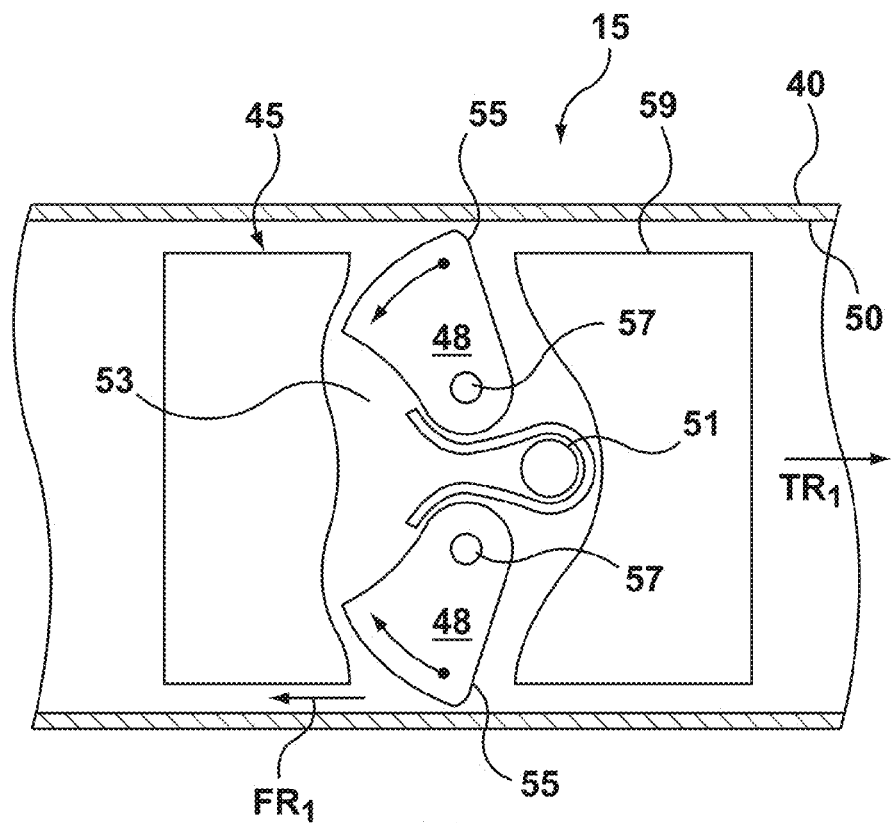
FIGS. 17a,b show a further alternative embodiment of the counterbalance mechanism shown in FIGS. 4 and 6.

Referring to FIGS. 17*a,b*, shown is an alternative embodiment of the friction counterbalance mechanism 15 having the travel member 45 supported by support member 52 (or lead screw 140) on an interior peripheral surface 50 of the elongate member 40 configured as a hollow tube (e.g. the travel member 45 is positioned for reciprocation on the interior surface 50 of the elongate member 40 as pushed/pulled by support member 52 or lead screw 140). As such, different configurations of the travel member 45 and elongate member 40 are contemplated by the friction counterbalance mechanism 15 including different cross sectional shapes as well as internal and/or external peripheral surfaces 50 for contact with the friction elements 48. The frictional elements 48 can be a pair of inserts 48 biased away from one another and into contact with the peripheral surface 50 by one or more spring body 51, as mounted internal to the body 59 of the travel member 45.

Therefore, as the travel member 45 travels TR along the elongate member 40, the friction element(s) 48 contact the surface 50 of the elongate member 40, thus causing the generation of a friction force FR1,FR2 due to the combined configuration of friction configuration parameters (e.g. a selected coefficient of friction, selected contact pressure also referred to as normal force, and/or selected contact area, etc.) between the friction element(s) 48 and the surface 50. In a cross sectional region 42 of greater cross section dimension for external surfaces 50 (see FIG. 4), it is expected that the friction force magnitude FR1,FR2 would be greater than in a cross sectional region 42 of lesser cross section dimension. Alternatively, in a cross sectional region 42 of lesser cross section dimension for internal surfaces 50 (see FIG. 6), it is expected that the friction force magnitude FR1,FR2 would be greater than in a cross sectional region 42 of greater cross section dimension. As such, it is recognized that the friction force magnitude FR1,FR2 produced between contact between the friction element(s) 48 and the surface 50 can be variable along the longitudinal axis 41 of the elongate member 40 as the cross sectional dimension (e.g. diameter) is varied (or any one of or any two or more of the friction configuration parameters are varied).

In movement of the travel member 45, the opposed inserts 48 can reside inside slots 53 of the body 59. Spring 51 compresses at assembly process of the travel member 45 and thus contributes to the selection and configuration of the amount of friction force magnitude FR1, FR2 generated between inserts 48 and the peripheral surface 50. For example, this friction force magnitude FR1,FR2 can be function of relative translational and/or relative rotational movement (in the case of a rotating travel member 45—for example under influence of the power screw 140 of FIG. 14) between surface 50 and travel member 45 if surface 50 has variable internal diameter (see FIG. 6). It is noted that the friction force magnitude FR1 would be less than friction force magnitude FR2, based on the differing linear (e.g. stroke) direction of travel TR1 and TR2. As for direction TR1, friction between the surface 50 and surface 55 would cause the opposed inserts 48 to be forced towards one another and into their respective slots 53 against the bias provided by the spring 51, about their respective pivots 57. This is in comparison to the direction TR2, as friction between the surface 50 and surface 55 would cause the opposed inserts 48 to be forced away from one another and out of their respective slots 53 (hence working with the bias provided by the spring 51), about their respective pivots 57, to generate a greater normal force (and hence corresponding magnitude friction force FR2) between the surfaces 50,55 than that for opposite travel direction TR1. As such, the friction based counterbalance mechanism 15 shown in FIG. 17*a,b* provides for differencing magnitudes of the friction force FR1,FR2, depending upon the relative linear direction of travel of the travel member 45 along the longitudinal axis 41 (i.e. travel direction TR1 is opposite to travel direction TR2). Further, it is recognized that the inserts 48 of the travel member embodiment shown in FIG. 17*a,b* can be configured as shown in FIG. 4, such that the elongate member 40 supports the travel member 45 on an exterior peripheral surface 50 (e.g. the travel member 45 is positioned for reciprocation on the exterior surface 50 of the elongate member 40) and the leaf spring inserts 48 would be biased (e.g. via one or more springs 51) towards one another and thus towards the exterior peripheral surface 50 upon which the body is mounted for motion along (and optionally around).

Referring to FIGS. 18*a,b,c* shown is an alternative embodiment of the friction counterbalance mechanism 15 having the travel member 45 supported by support member 52 (or lead screw 140) on an interior peripheral surface 50 of the elongate member 40 configured as a hollow tube (e.g. the travel member 45 is positioned for reciprocation on the interior surface 50 of the elongate member 40 as well as rotation about the longitudinal axis 41 as pushed/pulled by lead screw 140). As such, different configurations of the travel member 45 and elongate member 40 are contemplated by the friction counterbalance mechanism 15 including different cross sectional shapes D1,D2,D3 as well as internal and/or external peripheral surfaces 50 for contact with the friction elements 48. The frictional elements 48 can be one or more biased arms 48 (e.g. 4 is shown by example only) biased outwards and into contact with the peripheral surface 50 by one or more biasing member 51, as mounted internal to the body 59 of the travel member 45. In this example, the biased arms 48 can have a cam shaped surface 55 and biased respectively about a biasing location 61 of the body 59.

Therefore, as the travel member 45 travels helically TR along the elongate member 40 and about the longitudinal axis 41, the friction element(s) 48 contact the surface 50 of the elongate member 40, thus causing the generation of a friction force FR1,FR2 due to the combined configuration of friction configuration parameters (e.g. a selected coefficient of friction, selected contact pressure also referred to as normal force, and/or selected contact area, etc.) between the friction element(s) 48 and the surface 50. In a cross sectional region 42 of greater cross section dimension for external surfaces 50 (see FIG. 4), it is expected that the friction force magnitude FR1,FR2 would be greater than in a cross sectional region 42 of lesser cross section dimension. Alternatively, in a cross sectional region 42 of lesser cross section dimension for internal surfaces 50 (see FIG. 6), it is expected that the friction force magnitude FR1,FR2 would be greater than in a cross sectional region 42 of greater cross section dimension. As such, it is recognized that the friction force magnitude FR1,FR2 produced between contact between the friction element(s) 48 and the surface 50 can be variable along the longitudinal axis 41 of the elongate member 40 as the cross sectional dimension (e.g. diameter) is varied (or any one of or any two or more of the friction configuration parameters are varied).

In movement of the travel member 45, the biased arms 48 can reside inside slots 53 of the body 59. Spring 51 component (e.g. effective leaf spring) of the biased arms 48 compresses at assembly process of the travel member 45 and thus contributes to the selection and configuration of the amount of friction force magnitude FR1, FR2 generated between biased arms 48 and the peripheral surface 50. For example, this friction force FR can be function of relative rotational movement (in the case of a rotating travel member 45—for example under influence of the power screw 140 of FIG. 14) between surface 50 and travel member 45. It is noted that the friction force magnitude FR1 would be less than friction force magnitude FR2, based on the differing rotational direction R1 and R2, as for direction R1, friction between the surface 50 and surface 55 would cause the biased arms 48 to be forced towards one another and into their respective slots 53 against the bias provided by the spring component 51. This is in comparison to the rotational direction R2, as friction between the surface 50 and surface 55 would cause the biased arms 48 to be forced away from one another and out of their respective slots 53 (hence working with the bias provided by the spring component 51 to bias the biased arms 48 away from the body location 61) to generate a greater normal force (and hence friction force magnitude FR2) between the surfaces 50,55 than that for opposite rotational direction R1. As such, the friction based counterbalance mechanism 15 shown in FIG. 18*a,b,c* provides for differencing magnitudes of the friction force FR1, FR2, depending upon the rotational direction of travel of the travel member 45 about the longitudinal axis 41 (i.e. travel direction R1 is opposite to travel direction R2). Further, it is recognized that the biased arms 48 of the travel member embodiment shown in FIG. 18*a,b,c* can be configured as shown in FIG. 4, such that the elongate member 40 supports the travel member 45 on an exterior peripheral surface 50 (e.g. the travel member 45 is positioned for reciprocation on the exterior surface 50 of the elongate member 40) and the biased arms 48 would be forced (e.g. via one or more spring components 51) towards the body location 61 and thus towards the exterior peripheral surface 50 upon which the body is mounted for motion along (and around).

Referring to FIG. 19, shown is an alternative embodiment of the friction counterbalance mechanism 15 having the travel member 45 supported by lead screw 140 on an interior peripheral surface 50 of the elongate member 40 configured as a hollow tube (e.g. the travel member 45 is positioned for reciprocation on the interior surface 50 of the elongate member 40 as pushed/pulled by lead screw 140). As such, different configurations of the travel member 45 and elongate member 40 are contemplated by the friction counterbalance mechanism 15 including different cross sectional shapes as well as internal and/or external peripheral surfaces 50 for contact with the friction elements 48. The frictional elements 48 are mounted on the body 59 for contact with the peripheral surface 50.

Therefore, as the travel member 45 travels TR1,TR2 along the elongate member 40, the friction element(s) 48 contact the surface 50 of the elongate member 40, thus causing the generation of a friction force FR1,FR2 due to the combined configuration of friction configuration parameters (e.g. a selected coefficient of friction, selected contact pressure also referred to as normal force, and/or selected contact area, etc.) between the friction element(s) 48 and the surface 50. In a cross sectional region 42 of greater cross section dimension for external surfaces 50 (see FIG. 4), it is expected that the friction force FR1,FR2 would be greater than in a cross sectional region 42 of lesser cross section dimension. Alternatively, in a cross sectional region 42 of lesser cross section dimension for internal surfaces 50 (see FIG. 6), it is expected that the friction force FR1,FR2 would be greater than in a cross sectional region 42 of greater cross section dimension. As such, it is recognized that the friction force FR1,FR2 produced between contact between the friction element(s) 48 and the surface 50 can be variable along the longitudinal axis 41 of the elongate member 40 as the cross sectional dimension (e.g. diameter) is varied (or any one of or any two or more of the friction configuration parameters are varied).

For example, this friction force magnitude FR1,FR2 can be function of relative translational and/or relative rotational movement (in the case of a rotating travel member 45—for example under influence of the power screw 140 of FIG. 14) between surface 50 and travel member 45 if surface 50 has variable internal cross sectional dimension such as diameter (see FIG. 6). The friction based counterbalance mechanism 45 can also have a pair of plates 72,74, such that a biasing element 51 (e.g. spring) forces rotating surface 73 of rotating plate 72 positioned at fixed position (on the longitudinal axis 41) against a fixed position (on the longitudinal axis 41) of rotationally stationary surface 75 (e.g. non-rotating) of plate 74, due to rotation of the travel member 45 about the longitudinal axis 41 as the power screw 140 is rotated by the drive mechanism 136 (see FIG. 14). As the travel member 45 moves in linear direction TR1, the biasing member 51 would decrease in compression (e.g. elongate in length) and thus decrease in its force of the plates 72,74 against one another, which would result in a decrease in the friction force magnitude FR1 as the travel member 45 continues to move in linear direction TR1. On the contrary, as the travel member 45 moves in opposite linear direction TR2, the biasing member 51 would shorten in length (e.g. increase in compression) and thus increase in its force of the plates 72,74 against one another, which would result in an increase in the friction force magnitude FR2 as the travel member 45 continues to move in linear direction TR2. As such, the position of the travel member 45 dictates the relative extension or compression of the biasing member 51, and thus makes the friction force FR1,FR2 a function of relative position of the travel member 45 along the longitudinal axis 41. As such, the relative rotational movement of the surfaces 73,75 with respect to one another (due to rotation of the travel member 45 by the drive of the power screw 140), in combination with the length of the biasing element 51 due to position of the travel member 45 on the longitudinal axis 41, affects the magnitude of the friction force FR1,FR2 generated by the translational and rotational motion of the travel member 45 with respect to the longitudinal axis 41.

Figure 20:
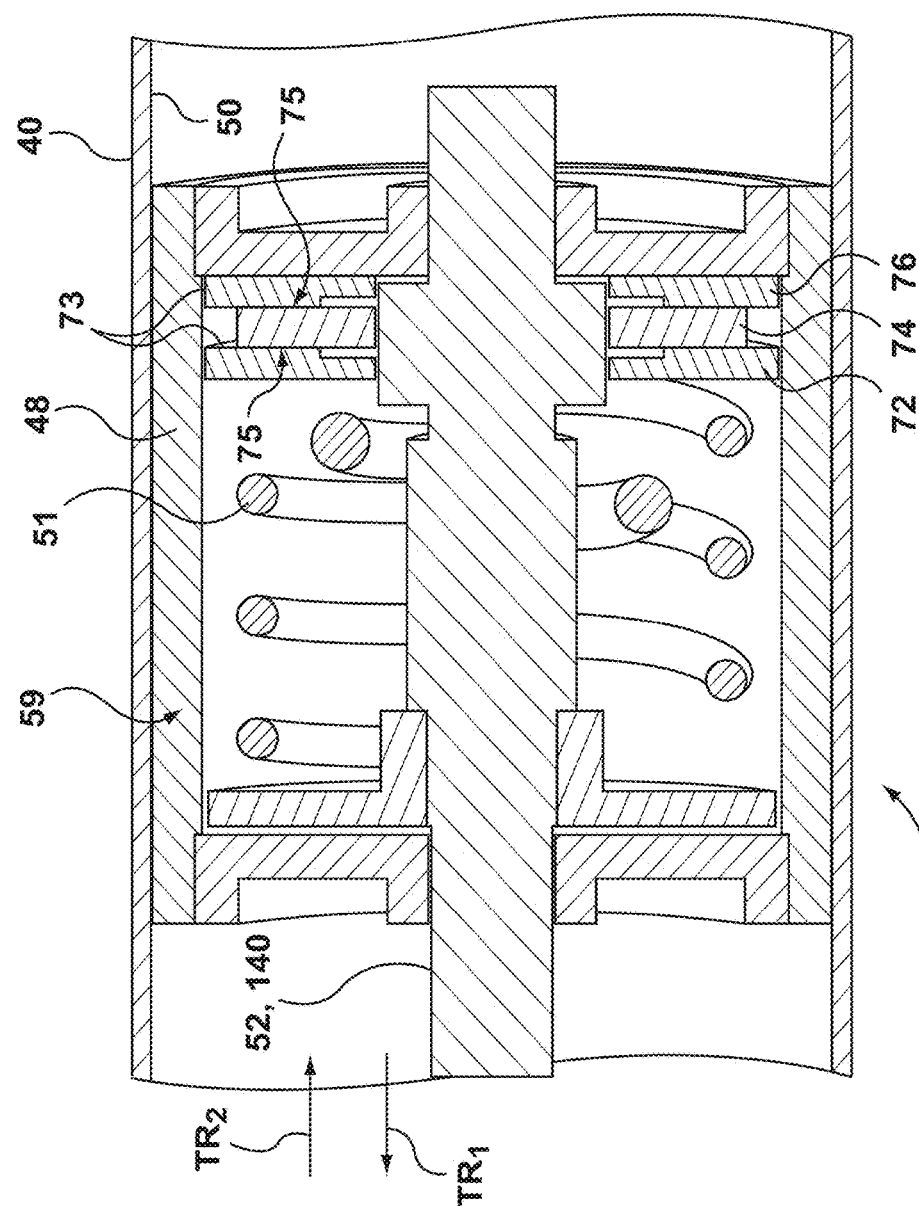
FIG. 20 shows a further alternative embodiment of the counterbalance mechanism shown in FIGS. 4 and 6.

Referring to FIG. 20, shown is an alternative embodiment of the friction counterbalance mechanism 15 having the travel member 45 supported on an interior peripheral surface 50 of the elongate member 40 configured as a hollow tube (e.g. the travel member 45 is positioned for reciprocation on the interior surface 50 of the elongate member 40). As such, different configurations of the travel member 45 and elongate member 40 are contemplated by the friction counterbalance mechanism 15 including different cross sectional shapes as well as internal and/or external peripheral surfaces 50 for contact with the friction elements 48. The frictional elements 48 are mounted on the body 59 for contact with the peripheral surface 50. Alternatively, the body 59 would not have the friction elements 48 in contact with the peripheral surface 50 (e.g. for example due to changes in the cross sectional dimension of the elongate member 40, due to an absence of the frictional elements 48 on the body 59, etc.).

For example, with influence of the frictional elements 48, as the travel member 45 travels TR1,TR2 along the elongate member 40, the friction element(s) 48 contact the surface 50 of the elongate member 40, thus causing the generation of a friction force magnitude FR1,FR2 due to the combined configuration of friction configuration parameters (e.g. a selected coefficient of friction, selected contact pressure also referred to as normal force, and/or selected contact area, etc.) between the friction element(s) 48 and the surface 50. In a cross sectional region 42 of greater cross section dimension for external surfaces 50 (see FIG. 4), it is expected that the friction force magnitude FR1,FR2 would be greater than in a cross sectional region 42 of lesser cross section dimension. Alternatively, in a cross sectional region 42 of lesser cross section dimension for internal surfaces 50 (see FIG. 6), it is expected that the friction force magnitude FR1,FR2 would be greater than in a cross sectional region 42 of greater cross section dimension. As such, it is recognized that the friction force FR1,FR2 produced between contact between the friction element(s) 48 and the surface 50 can be variable along the longitudinal axis 41 of the elongate member 40 as the cross sectional dimension (e.g. diameter) is varied (or any one of or any two or more of the friction configuration parameters are varied).

For example, this friction force FR1,FR2 can be function of relative translational and/or relative rotational movement (in the case of a rotating travel member 45—for example under influence of the power screw 140 of FIG. 14) between surface 50 and travel member 45 if surface 50 has variable internal cross sectional dimension such as diameter (see FIG. 6). The friction based counterbalance mechanism 45 can also have plates 72,74,76 such that one or more biasing elements 51 (e.g. spring) forces rotating surface(s) 73 of rotating plate(s) 72,76 against rotationally stationary surface(s) 75 (e.g. non-rotating) of plate 74, due to rotation of the travel member 45 about the longitudinal axis 41 as the power screw 140 is rotated by the drive mechanism 136 (see FIG. 14). As the travel member 45 moves in linear direction TR1, the biasing member 51 would decrease in compression (e.g. elongate in length) and thus decrease in its force of the plates 72,74,76 against one another, which would result in a decrease in the friction force magnitude FR1 as the travel member 45 continues to move in linear direction TR1. On the contrary, as the travel member 45 moves in opposite linear direction TR2, the biasing member 51 would shorten in length (e.g. increase in compression) and thus increase in its force of the plates 72,74,76 against one another, which would result in an increase in the friction force magnitude FR2 as the travel member 45 continues to move in linear direction TR2. As such, the linear position of the travel member 45 dictates the relative extension or compression of the biasing member 51, and thus makes the friction force magnitude FR1,FR2 a function of relative position of the travel member 45 along the longitudinal axis 41. As such, the relative rotational movement of the surfaces 73,75 with respect to one another (due to rotation of the travel member 45 by the drive of the power screw 140), in combination with the length of the biasing element 51 due to position of the travel member 45 on the longitudinal axis 41, affects the magnitude of the friction force magnitude FR1,FR2 generated by the translational and rotational motion of the travel member 45 with respect to the longitudinal axis 41.

In general, it is recognized that the configuration of the peripheral surface 50 (e.g. different diameter(s), different distance(s)/cross sectional areas between opposing surfaces/walls of the peripheral surface 50, differing coefficient(s) of friction) can determine amount of the friction force magnitude FR as the travel member 45 travels (e.g. linearly, rotationally, or both linearly and rotationally) along the elongate member 40. Similarly, it is recognized that the configuration of the surface 55 of the friction elements 48 (e.g. application of normal force against peripheral surface 50 due to differently configured biasing element(s) 51 of the body 59, differing coefficient(s) of friction of the surface 55, etc.) can determine amount of the friction force magnitude FR as the travel member 45 travels (e.g. linearly, rotationally, or both linearly and rotationally—also called helical) along the elongate member 40. Also, it is recognized that the configuration (e.g. shape, type, orientation, size, etc.) of the friction elements 48 can determine amount of the friction force magnitude FR as the travel member 45 travels (e.g. linearly, rotationally, or both linearly and rotationally) along the elongate member 40.

Further, it is recognized that the friction force magnitude FR can be generated due to: relative linear motion between the surfaces 50,55 (e.g. linear friction such as for biasing strut 37 shown in FIG. 10); relative rotational motion between the surfaces 50,55 (e.g. rotational friction such as generated in the travel member 45 of FIG. 16*a,b*, 17*a,b*); and/or relative helical motion between the surfaces 50,55 (e.g. helical friction such as generated in the electromechanical strut 37 of FIG. 14*a* when the travel member 45 rotates).

Further, it is recognized that the friction force magnitude FR generated can be variable versus stroke position of the travel member 45 along the longitudinal axis 41 of the elongate member 40 due to changes in the diameters of the peripheral surface 50 at different locations along the longitudinal axis 41, changes in the distance(s) between opposing surfaces/walls of the peripheral surface 50 at different locations along the longitudinal axis 41, and/or differing coefficient(s) of friction at different locations along the longitudinal axis 41. Examples of this variability in friction force magnitude FR verses stroke position of the travel member 45 is shown by example in FIGS. 4 and 6 and 12*a,b,c*.

Further, it is recognized that the friction force magnitude FR generated can be constant versus stroke position of the travel member 45 along the longitudinal axis 41 of the elongate member 40 due to consistency in the diameters of the peripheral surface 50 at different locations along the longitudinal axis 41, consistency in the distance(s) between opposing surfaces/walls of the peripheral surface 50 at different locations along the longitudinal axis 41, and/or consistency in coefficient(s) of friction at different locations along the longitudinal axis 41.

Figure 16B:
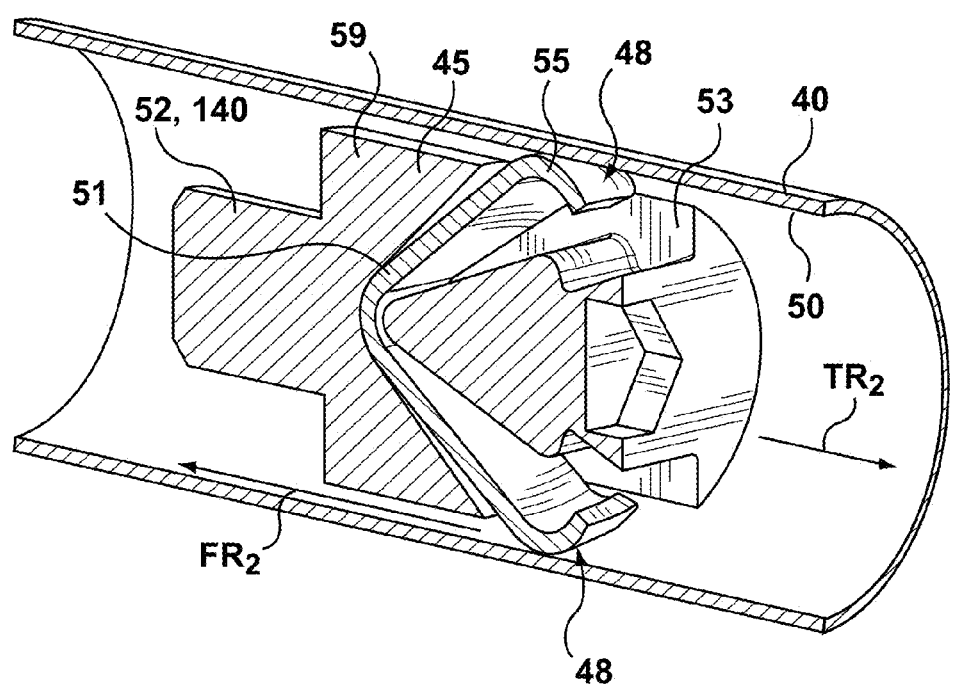
Figure 17B:
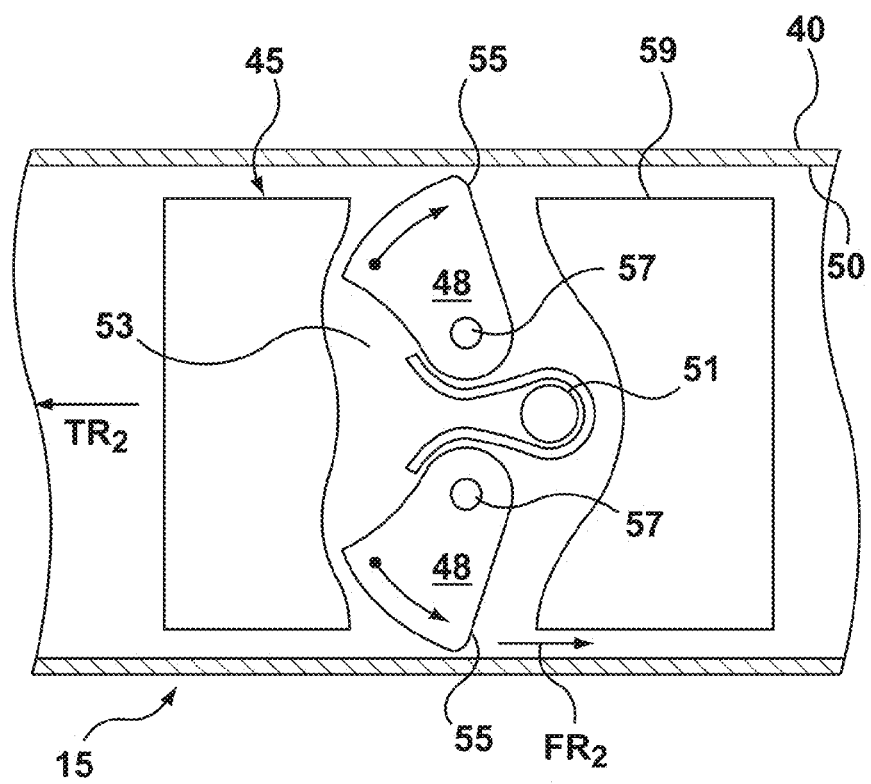

Further, it is recognized that the friction force magnitude FR generated can be variable versus relative direction of travel of the travel member 45 along the longitudinal axis 41 of the elongate member 40, due to differences in the normal force exerted between the surfaces 50,55 by cooperation of the friction elements 48 and the peripheral surface 50 based on configuration of the travel direction dependent operation of the friction elements 48 with respect to one another. For example, the pair of friction elements 48 can be biased away from one another at a greater magnitude (and hence forced into contact with the surface 50 at a greater force) in one travel direction TR as compared to the opposite travel direction along the longitudinal axis 41. Examples of this variability in friction force magnitude FR verses stroke position of the travel member 45 is shown, by example, in FIGS. 16 and 17.

Further, it is recognized that the friction force FR generated can be variable versus relative rotational direction of travel of the travel member 45 about the longitudinal axis 41 of the elongate member 40, due to differences in the normal force exerted between the surfaces 50,55 by cooperation of the friction elements 48 and the peripheral surface 50 based on configuration of the rotational travel direction dependent operation of the friction elements 48 with respect to one another. For example, the pair of friction elements 48 can be biased away from one another at a greater magnitude (and hence forced into contact with the surface 50 at a greater force) in one rotational travel direction R as compared to the opposite travel direction along the longitudinal axis 41. Examples of this variability in friction force magnitude FR verses rotational travel direction R of the travel member 45 is shown, by example, in FIGS. 18*a,b,c*.

Examples of Counterbalance Mechanism 15 Incorporated in Biasing Element 37

Referring to FIG. 8, shown is a biasing element 37 referred to as a biasing strut with a body 59 having a first end 60 for connecting to a closure panel 14 (or a vehicle body/frame 11) and a second end 62 for connecting to a vehicle body/frame 11 (or a closure panel 14), depending upon the configuration orientation of the biasing element 37 when installed in the closure panel system 12 (see FIG. 1). In this configuration, the counterbalance mechanism 15, by example only, has the elongate member 40 positioned in an interior 64 of the body 59 and the travel member 45 coupled to the proximal end 56 of the support member 52. The distal end of 54 the support member 52 is coupled to the second end 62 (for example via an optional element 66—spring) of the biasing element 37 (e.g. strut) and the proximal end 48 of the elongate member 40 is coupled to the other end 60. As shown by example are regions 42,44 of differencing cross sectional dimension. However, it is also recognized that any of the other influence factors mentioned above could be also or alternatively varied (e.g. each region is of the same cross sectional dimension but has differing surface treatment—e.g. one region is of rougher surface quality than the other thus providing for differing values of the respective coefficient of friction between the regions 42,44).

Figure 9:
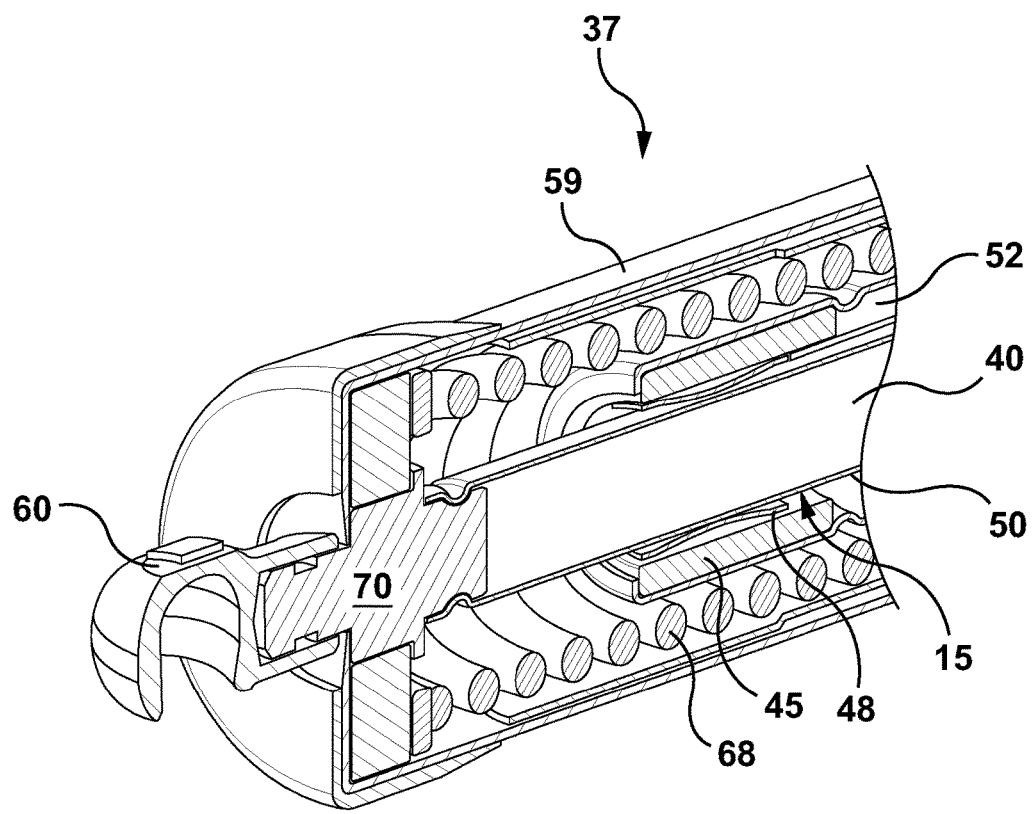
FIG. 9 shows further details of the biasing strut shown in FIG. 8.

As shown, the biasing element 37 is a strut having a resilient element of a spring 68 for providing the counterbalance torque T (see FIG. 3) during operation of the closure panel 14 in moving between the open and closed positions (see FIG. 1). Shown in FIG. 9 by example are further details of the elongate member 40 coupled to the end 60 of the biasing strut 37 by an optional element 70 (e.g. fitting), the spring 68 of the biasing strut 37 positioned about the friction counterbalance mechanism 15, the travel member 45 with frictional elements 48 in contact with the surface 50, the support tube 52 connected to the travel member 45 for guiding reciprocation of the travel member 45 along the elongate member 40, and the body 59 of the biasing strut 37 acting as a housing for the spring 68 and friction counterbalance mechanism 15.

Figure 10:
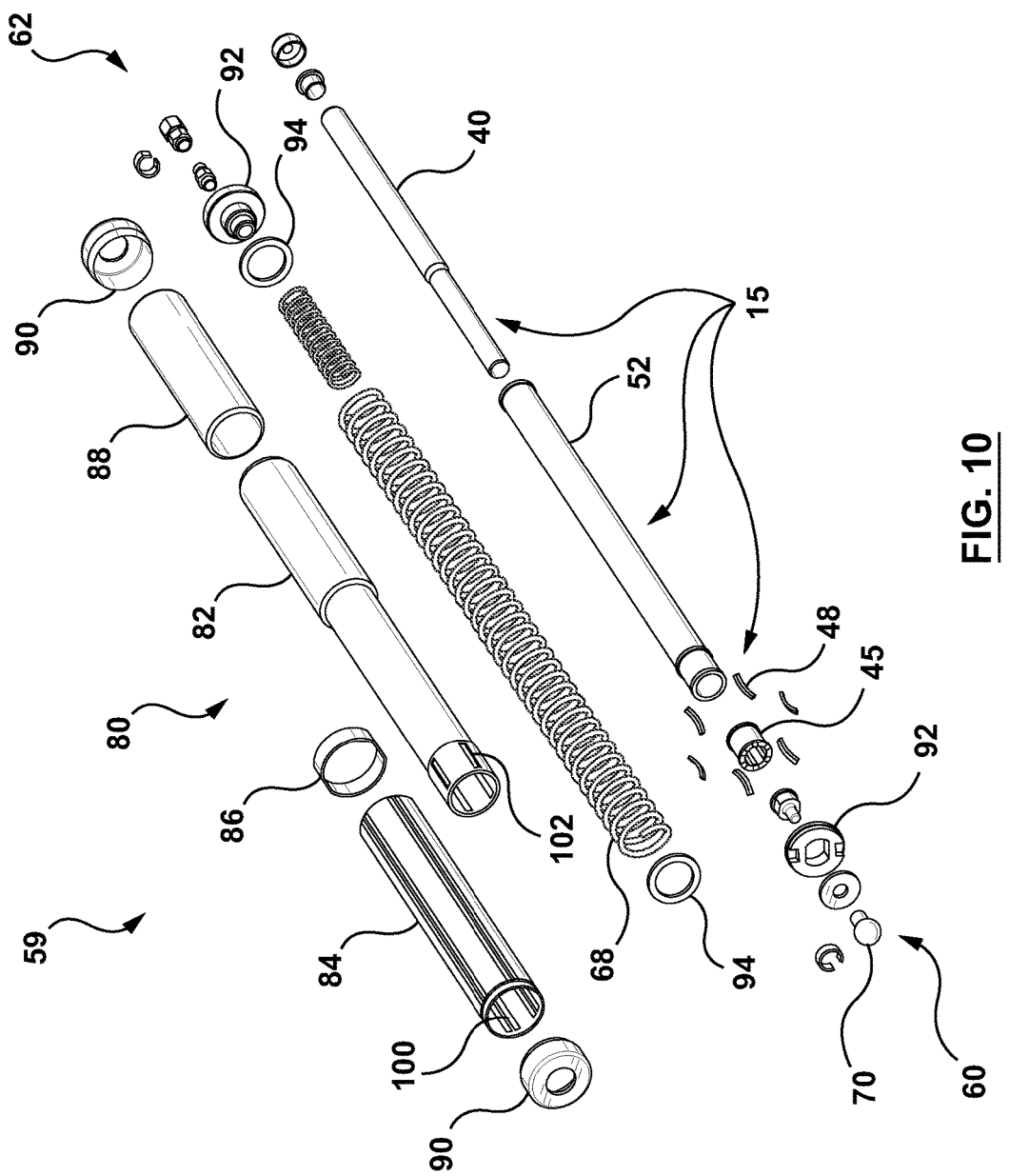
FIG. 10 is an exploded view of the biasing strut of FIG. 8.

Referring to FIG. 10, shown is the biasing strut 37 example for housing the friction counterbalance mechanism 15. The body 59 of the biasing strut is composed of a number of body elements 80 for facilitating extension and compression of the body 59 during operation of the closure panel 14 between the open and closed positions (see FIG. 1), thereby providing for the body 59 to act as a protective housing for the internal components (e.g. spring 68) of the biasing strut 37 and the enclosed friction counterbalance mechanism 15. The body 59 can have the optional body elements 80 of a cover tube 82, a sliding tube 84, a sliding cover 86, a filler tube 88, and end covers 90. Internally, the spring 68 can be mounted between end caps 92 via optional spring seats 94. Also shown are a series of splines 100 on sliding tube 84 configured to cooperate with mating splines 102 on cover tube 82, thus providing for inhibiting of rotation between the component parts of the biasing strut 37 as the biasing strut is operated between the open and closed positions of the closure panel 14.

Figure 11:
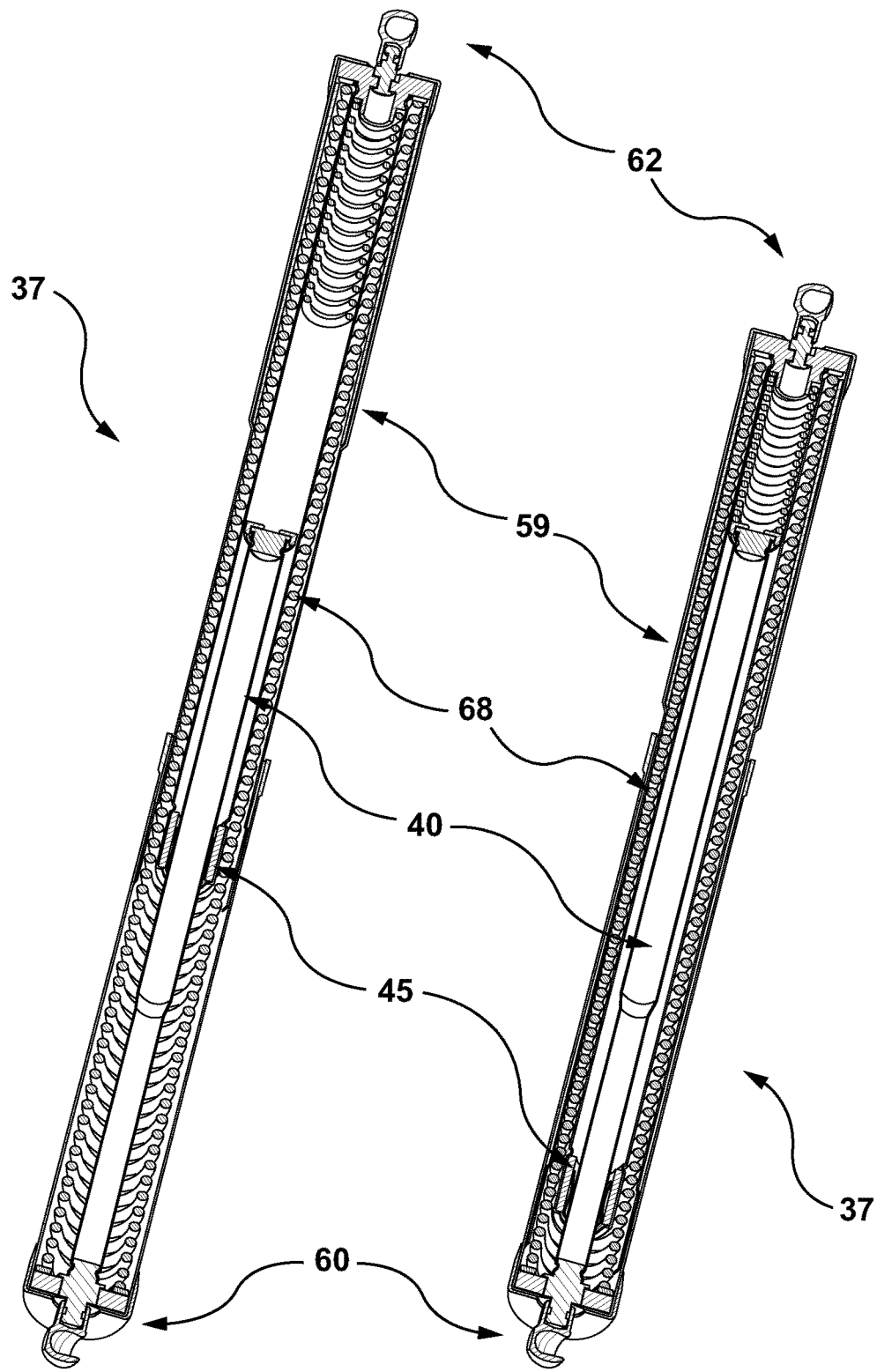
FIG. 11 shows example operation of the counterbalance mechanism shown in FIG. 4.

Referring to FIG. 11, shown is the biasing strut 37 is an extended position (e.g. when the closure panel 14 is fully open and/or in the third position hold range THR—see FIG. 3) and in a compressed position (e.g. when the closure panel 14 is in the closed position—see FIG. 1), exemplifying reciprocation of the travel element 45 along the elongate member 40 and expansion/contraction of the spring 68 (e.g. biasing element) contained within the body 59 (e.g. housing).

Figure 13:
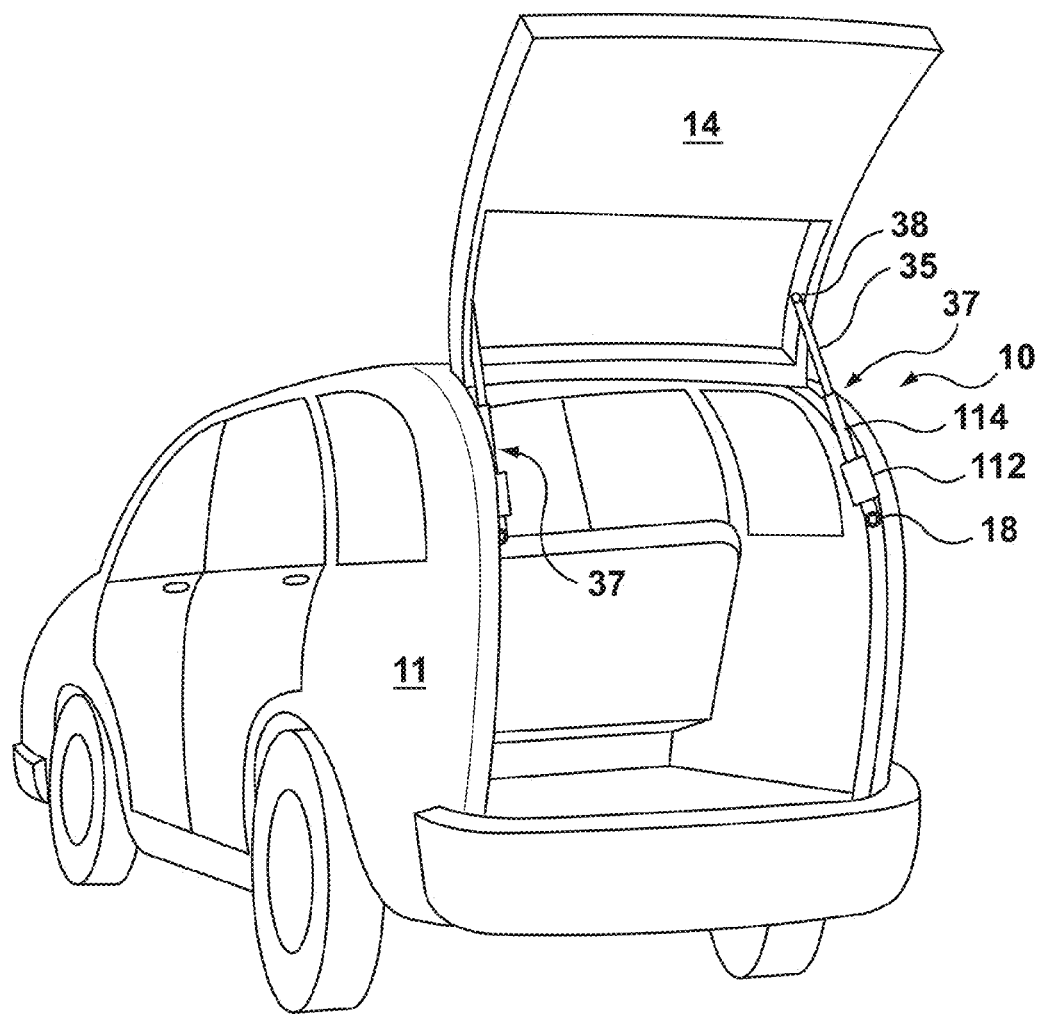
FIG. 13 shows an alternative embodiment of the vehicle with a closure panel assembly of FIG. 1.

Referring now to FIGS. 13 and 14*a,b,c,d*, an embodiment of the friction based counterbalance mechanism 15 for the motor vehicle 10 is shown. Electromechanical strut 37 as an example biasing member 37 includes a lower housing 112, an upper housing 114, and an extensible shaft/rod 35. A pivot mount 18, located at an end of lower housing 112 can be pivotally mounted to a portion of the vehicle body 11 that defines an interior cargo area in the vehicle 10. A second pivot mount 38 is attached to the distal end of extensible shaft 116, relative to upper housing 114, and is pivotally mounted to the lift gate 14 of the vehicle 10.

Referring now to FIG. 14, the interior of lower housing 112 is shown in greater detail, by example. Lower housing 112 provides a cylindrical sidewall 122 defining a chamber 124. Pivot mount 18 is attached to an end wall 126 of lower housing 112 proximal to the vehicle body 11. Upper housing 114 provides a cylindrical sidewall 40 (also referred to as elongate member) defining a chamber 34 that is open at both ends. The cylindrical sidewall 40 (also referred to as elongate member) has a peripheral surface 50 (as part of the friction-based counterbalance mechanism 15) for engaging the travel member 45 (also part of the friction-based counterbalance mechanism 15). A distal end wall 128 of lower housing 112 includes an aperture 130 so that chamber 124 and chamber 134 communicate with each other. Upper housing 114 can have a smaller diameter than lower housing 112. However, it is contemplated that lower housing 112 and upper housing 114 can also be formed as a single cylinder or frusto-cone. Other form factors for lower housing 112 and upper housing 114 will occur to those of skill in the art. Upper housing 114 can be integrally formed with lower housing 112, or it can be secured to lower housing 112 through conventional means (threaded couplings, weld joints, etc). An optional motor-gear assembly 136 is seated in chamber 124 and can be an integral component of the electromechanical strut 37 (e.g. situated internally in the housings 112,114 as shown or alternatively situated external to the housings 112,114—not shown).

The optional motor-gear assembly 136 can include a motor 142, a clutch, a planetary gearbox, and a power screw 140 (or referred to as a lead screw 140) which can be used to transport or otherwise guide the travel member 45 along the longitudinal axis 41. Motor 142 can be mounted within chamber 124 near end wall 126. Motor 142 can be a direct current bi-directional motor. Electrical power and direction control for motor 142 can be provided via electrical cables that connect into the vehicle body 11 through apertures (not shown) in end wall 126. The clutch is connected to an output shaft on motor 142. Clutch can provide a selective engagement between the output shaft of motor 142 and the planetary gearbox. Clutch is an electromechanical tooth clutch that engages planetary gearbox when motor 142 is activated, for example. When clutch is engaged, torque is transferred from motor 142 through to planetary gearbox. When clutch is disengaged, torque is not transferred between motor 142 and planetary gearbox so that occurrence of back drive can be limited if the lift gate 14 is closed manually. For example, the planetary gearbox can be a two-stage planetary gear that provides torque multiplication for power screw 140. Power screw 140 extends into upper housing 114. As such it is recognized that in the case where the motor assembly 136 is present, the lead screw 140 can be driven, i.e. actively rotated by the rotary motion of the motor assembly 136 coupled to the lead screw 140. Alternatively, in the case where the motor assembly 136 is not present, the lead screw 140 can rotate about the longitudinal axis 41 under the influence of friction present between the travel member 45 and the lead screw 140 in the bore 161, i.e. passively rotated by the linear motion of the travel member 45 as it rotates about the lead screw 140.

Extensible shaft 35 provides a cylindrical sidewall 154 defining a chamber 156 and can be concentrically mounted between upper housing 114 and power screw 140. As described earlier, pivot mount 38 is attached to the distal end of extensible shaft 35. The proximal end of extensible shaft 35 is open. A nut 45 (also referred to as the travel member 45) is mounted around the proximal end of extensible shaft 35 relative to lower housing 112 and is coupled with power screw 140 in order to convert the rotational movement of power screw 140 into the linear motion of the extensible shaft 35 along the longitudinal axis 41 of power screw 140. Drive nut 45 can includes splines that extend into opposing coaxial slots provided on the inside of elongate member 40 to inhibit nut 45 from rotating as the nut 45 travels along the longitudinal axis 41. Alternatively, the nut 45 may be configured without the splines and thus be free to rotate as the nut 45 travels along the longitudinal axis 41, without departing from the scope of the invention. An integrally-formed outer lip 164 in upper housing 114 can provide an environmental seal between chamber 134 and the outside. As shown in FIG. 4, the travel member 45 can have a series of friction elements 48 mounted with respect to the body 59 for engagement (e.g. biased) with the peripheral surface 50 of the elongate member 40.

A spring housing 138 is provided in lower housing 112 and is defined by cylindrical sidewall 122, end wall 128, and a flange 166. Within spring housing 138, a power spring 68 is coiled around power screw 140, providing a mechanical counterbalance to the weight of the lift gate 14. Preferably formed from a strip of steel, power spring 68 assists in raising the lift gate 14 both in its powered and un-powered modes of the electromechanical strut 37. One end of power spring 68 attaches to power screw 140 and the other is secured to a portion of cylindrical sidewall 122. When extensible shaft 35 is in its retracted position, power spring 68 is tightly coiled around power screw 140. As power screw 140 rotates to extend extensible shaft 35, in concert with travel of the travel member 45 along the elongate member 40 (incurring contact of the friction elements 48 with the peripheral surface 50), power spring 68 uncoils, releasing its stored energy and transmitting an axial force through extensible shaft 35 to help raise the lift gate 14. When power screw 410 rotates to retract extensible shaft 16, in concert with travel of the travel member 45 along the elongate member 40 (incurring contact of the friction elements 48 with the peripheral surface 50), power spring 68 recharges by recoiling around power screw 140.

Also shown in FIGS. 14b,14c is where the counterbalance mechanism 15 can have the travel body 45 connected to one or more of the lower housing 112 and/or the upper housing 114, such that the travel member 45 travels along the surface 50 provided by the other of the housings 112,114 adjacent to the travel member 45.

It is recognized that the differently configured biasing elements 48 discussed above can be used independently of one another, as mounted in the body 59 of the travel member 45 for a particular biasing element 37 (e.g. strut). For example, the travel member 45 having only leaf spring inserts 48 of FIGS. 16a,b, having only the pads 48 of FIGS. 15a,b, etc. Alternatively, two or more of the differently configured biasing elements 48 discussed above can be combined with one another and thus mounted together in the body 59 of the travel member 45, and/or can be configured in separate respective bodies 59 mounted for the same elongate member 40 (i.e. two or more travel members 45 having respective differently configured friction elements 48 for the same elongate member 40 positioned at different locations along the longitudinal axis 41). For example, it is recognized that any of the friction element 48 configurations shown in FIGS. 1 through 20 can be combined with any other of the friction element 48 configurations shown in FIGS. 1 through 20. As such, it is contemplated that the number of combinations of the different friction elements 48 (e.g. two or more) is limited only by the imagination of the designer when referring to the various embodiments of the different friction element 48 configurations shown in FIGS. 1 through 20.

As such, in view of the above, the friction based counterbalance mechanism 15 can be incorporated into a number of different biasing element 37 form factors. One example is the strut without lead screw 140 (see FIG. 10), hence the travel member 45 only travels linearly along the longitudinal axis 41. Another example is the strut with lead screw 140 (see FIG. 10), e.g. with or without the motor assembly 136, coupled to the travel member 45, hence the travel member 45 travels both linearly along the longitudinal axis 41 and rotationally about the longitudinal axis 41 (i.e. helical relative motion).

We claim:

1. A counterbalance mechanism for coupling with a closure panel to assist in opening and closing of the closure panel for at least a portion of a path between a fully closed position and a fully open position of the closure panel, the counterbalance mechanism including:
    a housing having a proximal end for coupling the counterbalance mechanism to one of the closure panel and a body of a vehicle and a distal end for coupling the counterbalance mechanism to the other of the closure panel and the body of the vehicle;
    an elongate member mounted in the housing and positioned on a longitudinal axis extending between the proximal and distal ends of the housing, the elongate member having a peripheral surface, the elongate member having a proximal end coupled to the proximal end of the housing;
    a travel member having a body and at least one friction member fixed in position on the longitudinal axis relative to the body, the travel member positioned on the longitudinal axis for reciprocation there along and for providing contact between the at least one friction member and the peripheral surface,
    a support member connected to the body of the travel member at a proximal end and coupled to the distal end of the housing at a distal end of the support member, the support member for guiding said reciprocation.

2. The counterbalance mechanism of claim 1 further comprising a resilient element mounted in the housing between the housing proximal end and the housing distal end, the resilient element configured to provide a counterbalance force as a biasing strut element to assist in the opening and closing of the closure panel.

3. The counterbalance mechanism of claim 1, wherein when providing the contact, the at least one friction member generates a first friction force magnitude in a first region along the longitudinal axis and a second friction force magnitude different from the first friction force magnitude in a second region along the longitudinal axis, the first region is spaced apart from the second region along the longitudinal axis.

4. The counterbalance mechanism of claim 3 further comprising the first region having a first friction configuration parameter different from a second friction configuration parameter of the second region, such that an experienced change in the first and second friction configuration parameter by the at least one friction member as the travel member travels from the first region to the second region results in a change in a magnitude of the friction force.

5. The counterbalance mechanism of claim 4, wherein the first friction configuration parameter is a width dimension of the elongate member and the second friction configuration parameter is a different width dimension of the elongate member.

6. The counterbalance mechanism of claim 3, wherein the elongate member has a third region along the longitudinal axis for generating the friction force by said contact.

7. The counterbalance mechanism of claim 1, wherein the at least one friction member is movable relative to the body in a direction lateral to the longitudinal axis.

8. A friction based counterbalance mechanism for coupling with a closure panel to assist in opening and closing of the closure panel for at least a portion of a path between a fully closed position and a fully open position of the closure panel, the counterbalance mechanism including:
    an elongate member positioned on a longitudinal axis extending between proximal and distal ends of the counterbalance mechanism, the elongate member having a peripheral surface, the elongate member having a proximal end for coupling to one of the closure panel and a body of a vehicle;
    a travel member having a body and at least one friction member fixed in position on the longitudinal axis relative to the body, the travel member positioned on the longitudinal axis for reciprocation there along and for providing contact between the at least one friction member and the peripheral surface; and
    a support member connected to the body of the travel member at a proximal end and for coupling at a distal end to the other of the closure panel and a body of a vehicle, the support member for guiding said reciprocation.

9. The friction based counterbalance mechanism of claim 8, wherein when providing the contact, the at least one friction member generates a first friction force magnitude in a first region along the longitudinal axis and a second friction force magnitude different from the first friction force magnitude in a second region along the longitudinal axis, the first region is spaced apart from the second region along the longitudinal axis.

10. The friction based counterbalance mechanism of claim 9 further comprising the first region having a first friction configuration parameter different from a second friction configuration parameter of the second region, such that an experienced change in the first and second friction configuration parameter by the at least one friction member as the travel member travels from the first region to the second region results in a change in a magnitude of the friction force.

11. The friction based counterbalance mechanism of claim 10, wherein the first friction configuration parameter is a width dimension of the elongate member and the second friction configuration parameter is a different width dimension of the elongate member.

12. The friction based counterbalance mechanism of claim 9, wherein the elongate member has a third region along the longitudinal axis for generating the friction force by said contact.

13. The friction based counterbalance mechanism of claim 8, wherein the at least one friction member is movable relative to the body in a direction lateral to the longitudinal axis.

* * * * *